US008695052B2

(12) United States Patent
Suzuki et al.

(10) Patent No.: US 8,695,052 B2
(45) Date of Patent: *Apr. 8, 2014

(54) NETWORK SYSTEM AND IMAGE PROJECTION APPARATUS

(71) Applicants: Tabito Suzuki, Tokyo (JP); Kazuhide Tanabe, Kanagawa (JP); Aritaka Hagiwara, Kanagawa (JP); Takuro Mano, Kanagawa (JP)

(72) Inventors: Tabito Suzuki, Tokyo (JP); Kazuhide Tanabe, Kanagawa (JP); Aritaka Hagiwara, Kanagawa (JP); Takuro Mano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,964

(22) Filed: Aug. 6, 2013

(65) Prior Publication Data

US 2013/0314427 A1 Nov. 28, 2013

Related U.S. Application Data

(62) Division of application No. 13/585,959, filed on Aug. 15, 2012, now Pat. No. 8,566,892.

(30) Foreign Application Priority Data

Aug. 18, 2011 (JP) ................................. 2011-179073

(51) Int. Cl.
*H04N 7/173* (2011.01)
(52) U.S. Cl.
USPC ............. 725/109; 725/86; 725/110; 709/201; 709/202; 709/203; 709/204; 709/205
(58) Field of Classification Search
USPC ..................... 725/86, 109–110; 709/201–205
See application file for complete search history.

(56) References Cited

U.S. PATENT DOCUMENTS

| 7,537,205 | B2 | 5/2009 | Nagata et al. | |
|---|---|---|---|---|
| 7,627,630 | B2* | 12/2009 | Chang et al. | 709/204 |
| 7,865,932 | B2* | 1/2011 | Kubota | 726/2 |
| 2005/0071430 | A1* | 3/2005 | Kobayashi et al. | 709/205 |
| 2005/0155070 | A1* | 7/2005 | Slaughter | 725/86 |
| 2005/0160479 | A1* | 7/2005 | Kubota | 726/16 |
| 2007/0219839 | A1 | 9/2007 | Tanabe | |
| 2008/0178199 | A1 | 7/2008 | Tanabe | |
| 2008/0222233 | A1* | 9/2008 | Shi et al. | 709/201 |
| 2008/0307428 | A1 | 12/2008 | Hagiwara et al. | |
| 2009/0051953 | A1 | 2/2009 | Hagiwara et al. | |
| 2009/0064201 | A1 | 3/2009 | Tanabe | |

(Continued)

FOREIGN PATENT DOCUMENTS

| JP | 2006-146415 | 6/2006 |
|---|---|---|
| JP | 2009-294984 | 12/2009 |
| JP | 2010-122263 | 6/2010 |

*Primary Examiner* — Mulugeta Mengesha
(74) *Attorney, Agent, or Firm* — IPUSA, PLLC

(57) ABSTRACT

A network system includes an image projection apparatus that projects image data; a first terminal; and a second terminal where the first terminal includes an original image data storing unit that stores original image data and a corresponding information generating unit that generates corresponding information in which image identification data of the image data for projection, generated from the original image data, capable of identifying the original image data and terminal identification data for identifying the first terminal correspond with each other, and the image projection apparatus includes a corresponding information sending unit that sends, upon receiving the request for delivering the corresponding information of the image data being projected from the second terminal, the corresponding information stored in the storing unit, to the second terminal.

8 Claims, 29 Drawing Sheets

(56) References Cited

U.S. PATENT DOCUMENTS

| | | |
|---|---|---|
| 2009/0103828 A1 | 4/2009 | Shibukawa et al. |
| 2009/0109474 A1 | 4/2009 | Tanabe et al. |
| 2009/0300519 A1 * | 12/2009 | Sakiyama et al. ............ 715/753 |
| 2011/0007365 A1 | 1/2011 | Yukumoto et al. |
| 2011/0055325 A1 * | 3/2011 | Kubota ........................ 709/203 |
| 2011/0304878 A1 | 12/2011 | Yanazume et al. |

* cited by examiner

FIG.8

| IMAGE ID | DISPLAY START TIME | DISPLAY END TIME | OPERATION HISTORY |
| --- | --- | --- | --- |
| | | | OPERATION CONTENT |
| 1.jpg | 20110411120000 | 20110411120100 | MAGNIFY |
| 2.jpg | 20110411120100 | 20110411120200 | MAGNIFY |
| 3.jpg | 20110411120200 | 20110411120300 | – |
| 4.jpg | 20110411120300 | 20110411120400 | MAGNIFY |

| IMAGE ID | DISPLAY START TIME | DISPLAY END TIME | OPERATION HISTORY | | |
|---|---|---|---|---|---|
| | | | OPERATION CONTENT | MAGNIFICATION SCALE | MAGNIFICATION CENTER |
| 1.jpg | 20110411120000 | 20110411120100 | MAGNIFY | ×4 | (30, 40) |
| 2.jpg | 20110411120100 | 20110411120200 | MAGNIFY | | |
| 3.jpg | 20110411120200 | 20110411120300 | — | | |
| 4.jpg | 20110411120300 | 20110411120400 | MAGNIFY | | |

34

NETWORK SYSTEM AND IMAGE PROJECTION APPARATUS

CROSS-REFERENCE TO RELATED APPLICATIONS

This application is a divisional application of U.S. patent application Ser. No. 13/585,959 filed on Aug. 15, 2012, which claims the benefit of priority of Japanese Patent Application No. 2011-179073 filed on Aug. 18, 2011, where the entire contents of all applications are incorporated herein by reference.

BACKGROUND OF THE INVENTION

1. Field of the Invention

The present invention relates to a network system and an image projection apparatus.

2. Description of the Related Art

As a projector can project an enlarged image, the projector has been widely used at various situations such as a meeting in an office, various kinds of presentations, a school or the like where a presenter presents an image to plural people.

Further, the projector has been developed to have plural functions in addition to a display function. Especially, the projector has been developed to have functions actualized with other devices which are connected with each other via a network. For example, a projector having a function to connect to a network, can receive an operation or an image file from a Personal Computer (PC) which is connected via the network, and decode the image file to be projected. For such an operation of the projector, generally, utility software is used. For example, the utility software is installed in the PC so that the PC can be easily wirelessly connected to the projector and file transfer an image file of a predetermined format. Thus, even when the functions are increased, the projector can be easily used.

For example, when the projector can handle a JPEG image file, a PC connected to the projector via a network converts an image file stored in the PC to be in JPEG format using utility software and sends the image file to the projector. Further, the PC converts format, resolution, color tone, and compression ratio of the image file to be capable of being handled by the projector using the utility software.

The reason for performing such processing by a PC, not by a projector is that generally, memory capacity or performance of a CPU of a projector is lower than that of the PC, or resolution of an image file capable of being handled by the projector is lower than that of the PC. Thus, it is necessary for a PC to generate an image file, which can be handled by a projector, from an image file stored in the PC, using utility software to send the generated image file to the projector.

A technique in which the projector sends an image file being projected to PCs of participants is known (see Patent Document 1 for example). Patent Document 1 discloses a technique in which an image being projected by a projector is captured to be sent to a PC of a participant as an image file. Thus, it is described that the PC of the participant can display the image file with a browser.

However, there may be a problem that the image file sent to the PCs of the participants by the projector is different from the original image file stored in the PC of the presenter.

[Patent Document]

[Patent Document 1] Japanese Laid-open Patent Publication No. 2010-122263

SUMMARY OF THE INVENTION

The present invention is made in light of the above problems, and provides a network system capable of delivering appropriate image data to a participant.

According to an embodiment, there is provided a network system including an image projection apparatus that projects image data; a first terminal; and a second terminal, connected with each other via a network, wherein the first terminal includes an original image data storing unit that stores original image data, an image data generating unit that generates image data for projection, for which an amount of information is reduced from the original image data, from the original image data, a corresponding information generating unit that generates corresponding information in which image identification data of the image data for projection capable of identifying the original image data and terminal identification data for identifying the first terminal correspond with each other, a first sending unit that sends the image data for projection with the respective corresponding information to the image projection apparatus, a reading unit that reads, upon receiving a request for delivering the original image data stored in the original image data storing unit including the image identification data from the second terminal, the original image data from the original image data storing unit based on the image identification data included in the request, and a second sending unit that sends the original image data read by the reading unit to the second terminal, wherein the second terminal includes a first obtaining unit that sends a request for delivering the corresponding information of image data being projected by the image projection apparatus to the image projection apparatus, and obtains the corresponding information sent from the image projection apparatus in response to the request, and a second obtaining unit that sends the image identification data included in the corresponding information and a request for delivering image data to the first terminal specified by the terminal identification data included in the corresponding information obtained by the first obtaining unit and obtains the original image data based on the image identification data from the first terminal, and wherein the image projection apparatus includes a storing unit that stores the image data for projection in correspondence with the corresponding information sent from the first sending unit, an image projection unit that projects the image data for projection, and a corresponding information sending unit that sends, upon receiving the request for delivering the corresponding information of the image data being projected from the second terminal, the corresponding information stored in the storing unit, to the second terminal.

According to another embodiment, there is provided an image projection apparatus, connected to a first terminal and a second terminal via a network, wherein the first terminal includes an original image data storing unit that stores original image data, an image data generating unit that generates image data for projection, for which an amount of information is reduced from the original image data, from the original image data, a corresponding information generating unit that generates corresponding information in which image identification data of the image data for projection capable of identifying the original image data and terminal identification data for identifying the first terminal correspond with each other, a first sending unit that sends the image data for projection with the respective corresponding information to the image projection apparatus, a reading unit that reads, upon receiving a request for delivering the original image data stored in the original image data storing unit including the image identification data from the second terminal, the original image data from the original image data storing unit based on the image identification data included in the request, and a second sending unit that sends the original image data read by the reading unit to the second terminal, and the second terminal includes a first obtaining unit that sends a request for delivering the corresponding information of image data being projected by the image projection apparatus to the image projection apparatus, and obtains the corresponding information sent from the image projection apparatus in response to the request, and a second obtaining unit that sends the image identification data included in the corresponding information and a request for delivering image data to the first terminal specified by the terminal identification data included in the corresponding information obtained by the first obtaining unit and obtains the original image data based on the image identification data from the first terminal, the image projection apparatus including a storing unit that stores the image data for projection in correspondence with the corresponding information sent from the first sending unit; an image projection unit that projects the image data for projection; and a corresponding information sending unit that sends, upon receiving the request for delivering the corresponding information of the image data being projected from the second terminal, the corresponding information stored in the storing unit, to the second terminal.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 8 is a view showing an example of history information of an embodiment;

FIG. 25 is a view showing an example of the history information of an embodiment;

DETAILED DESCRIPTION OF THE PREFERRED EMBODIMENTS

Before describing of the present embodiment, the related art will be explained in detail with reference to FIG. 1 in order to facilitate the understanding of the present invention.

Figure 1:
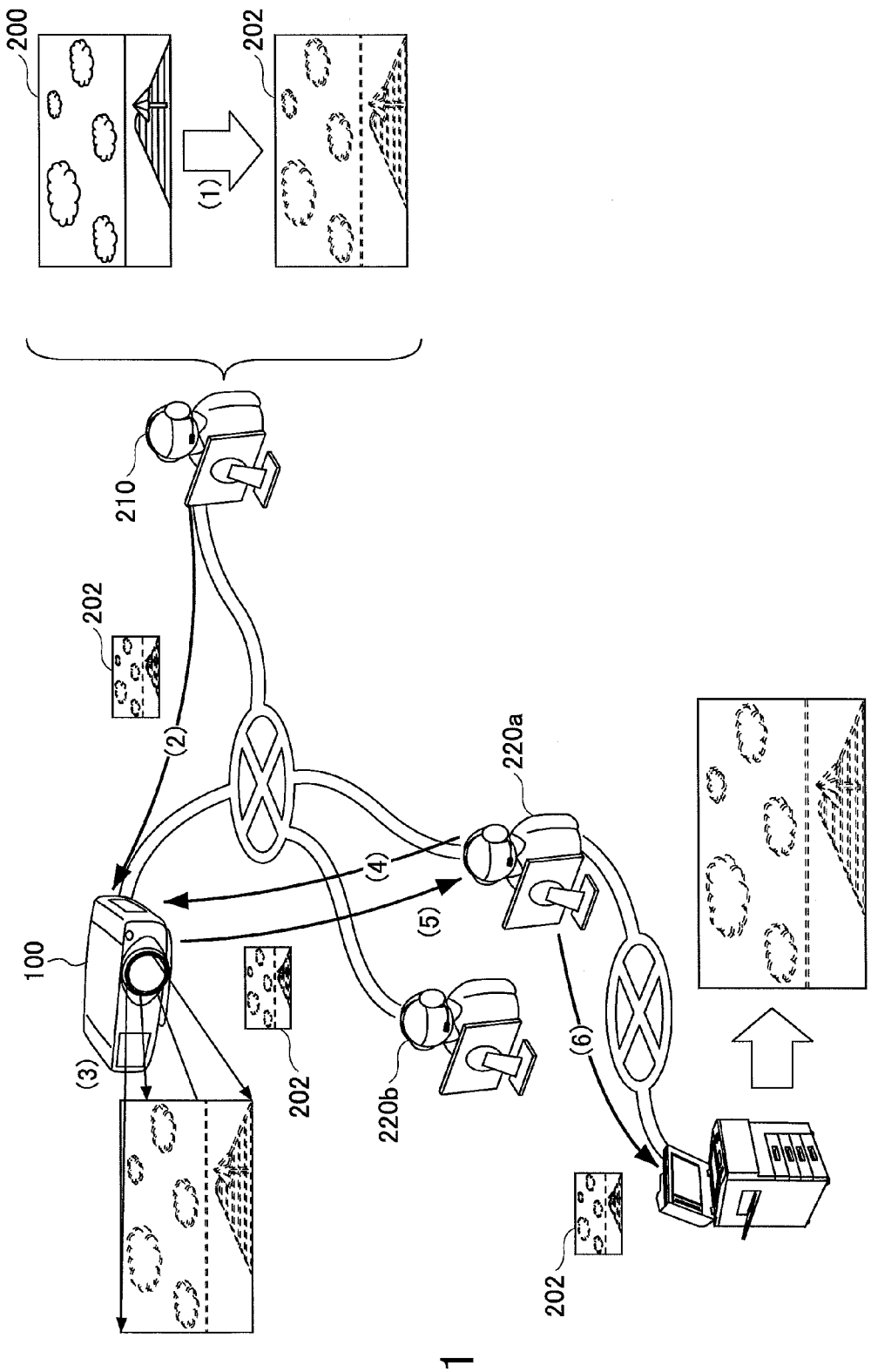
FIG. 1 is a schematic view showing an example of a relationship between an image file sent to a PC of a participant and an image file stored in a PC of a presenter.

FIG. 1 is a schematic view showing an example of a relationship between an image file sent to a PC of a participant and an image file stored in a PC of a presenter.

(1) A PC of a presenter 210 converts an original image file 200 to an image file for projection 202 using utility software before sending.

(2) The PC of the presenter 210 sends the image file for projection 202 to a projector 100. The image file for projection 202 sent to the projector 100 no further has a correspondence with the original image file 200.

(3) The projector 100 decodes the image file for projection 202 to project.

(4) A participant 220a, for example, operates a PC of the participant 220a to capture the image being projected.
(5) The projector 100 sends the image file for projection 202 to the PC of the participant 220a.
(6) Thus, the participant 220a can print out the image file for projection 202 using the PC.

However, in this case, the image file sent to the PC of the participant 220a is the image file for projection 202, and the quality of the printed object may be low. The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 2:
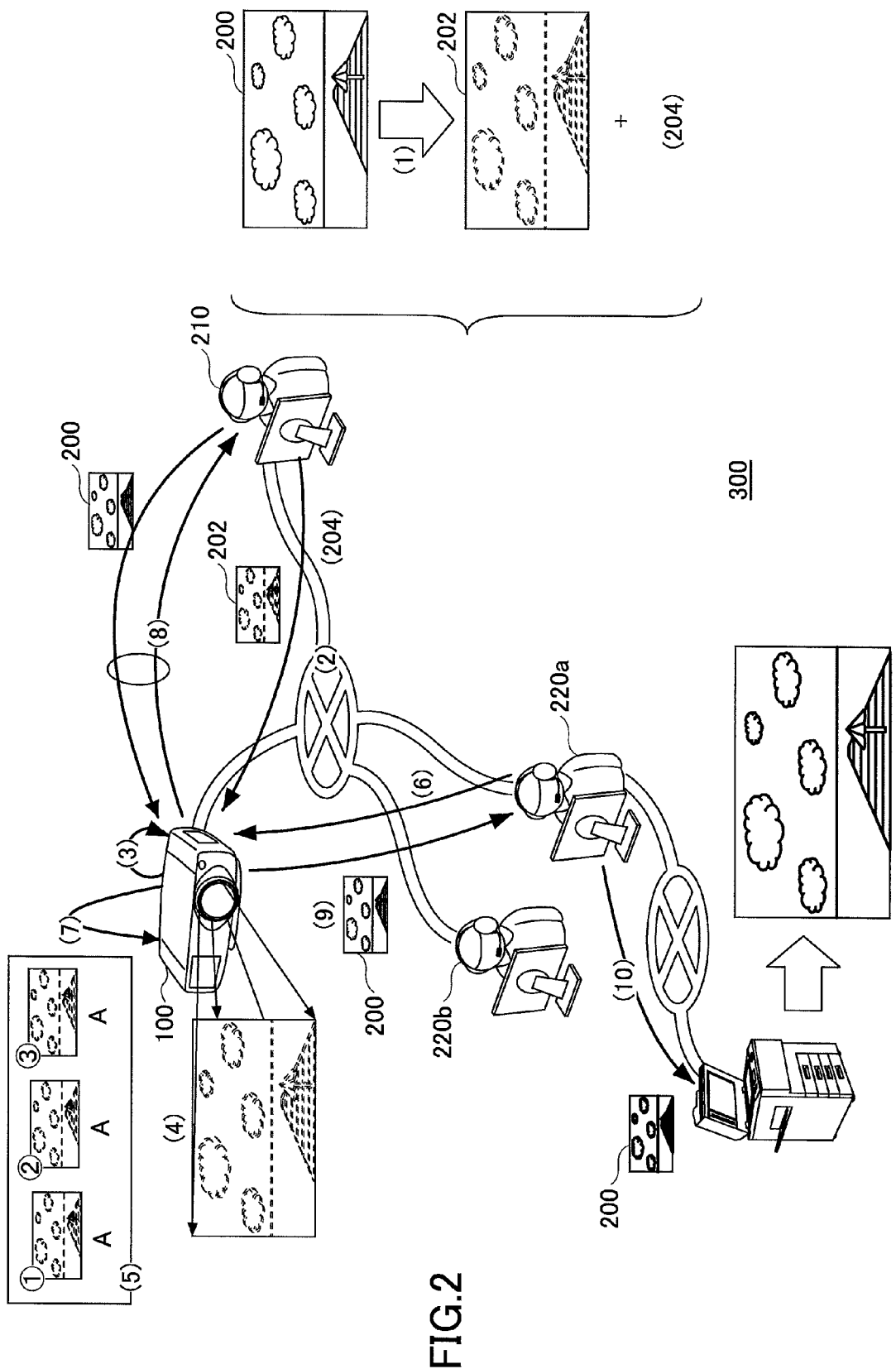
FIG. 2 is a schematic view showing an example of an image projection system of an embodiment.

FIG. 2 is a schematic view showing an example of an image projection system 300 of the embodiment. According to the image projection system 300 of the embodiment, the participant terminal can obtain an original image file 200 generated by the presenter, not an image file for projection 202. The total operation of obtaining the original image file 200 is explained.

(1) A presenter terminal of a presenter 210 converts an original image file 200 to an image file for projection 202 using utility software before sending. The utility software may cause the image file for projection 202 to correspond with the original image file 200, by putting the same name to the original image file 200 and the image file for projection 202 and store them in different folders or the like, for example.
(2) The presenter terminal generates corresponding information 204 in which an image ID of the image file for projection 202 (which is also image ID of the original image file 200 or capable of specifying the original image file 200), an IP address of the presenter terminal and a delivering permit flag correspond with each other. Then, the presenter terminal sends the image file for projection 202 and the corresponding information 204 to a projector 100.
(3) The projector 100 stores the image file for projection 202 with the corresponding information 204.
(4) The projector 100 decodes the image file for projection 202 and projects the image file for projection 202 on a screen.
(5) The projector 100 records a projection history of the projected image file for projection 202. In FIG. 2, the projection history is recorded that indicates three image files of a presenter "A" (210) have been projected. In the projection history, an operation history (magnified display or the like), a display period and the like are recorded for each of the image files.
(6) When a participant 220a, for example, wants to print or store an image file which is being projected, the participant 220a operates a respective participant terminal to send a request for delivering the image file with image ID of the image file to the projector 100.
(7) The projector 100 specifies the presenter terminal which sends the image file for which the participant 220a sends the request for delivering the image file based on the image ID included in the request and the corresponding information 204.
(8) The projector 100 obtains the original image file 200 from the presenter terminal which stores the original image file 200.
(9) The projector 100 sends the original image file 200 to the participant terminal which has sent the request for delivering the image file.
(10) Subsequently, the participant 220a can print the original image file 200 using the participant terminal. As the original image file 200 is not converted for projection, a printed object with a high quality can be obtained.

In the following, image data and an image file are not differentiated, when it is referred to as the image file, the image file may include image data as well.

(Structure)

Figure 3:
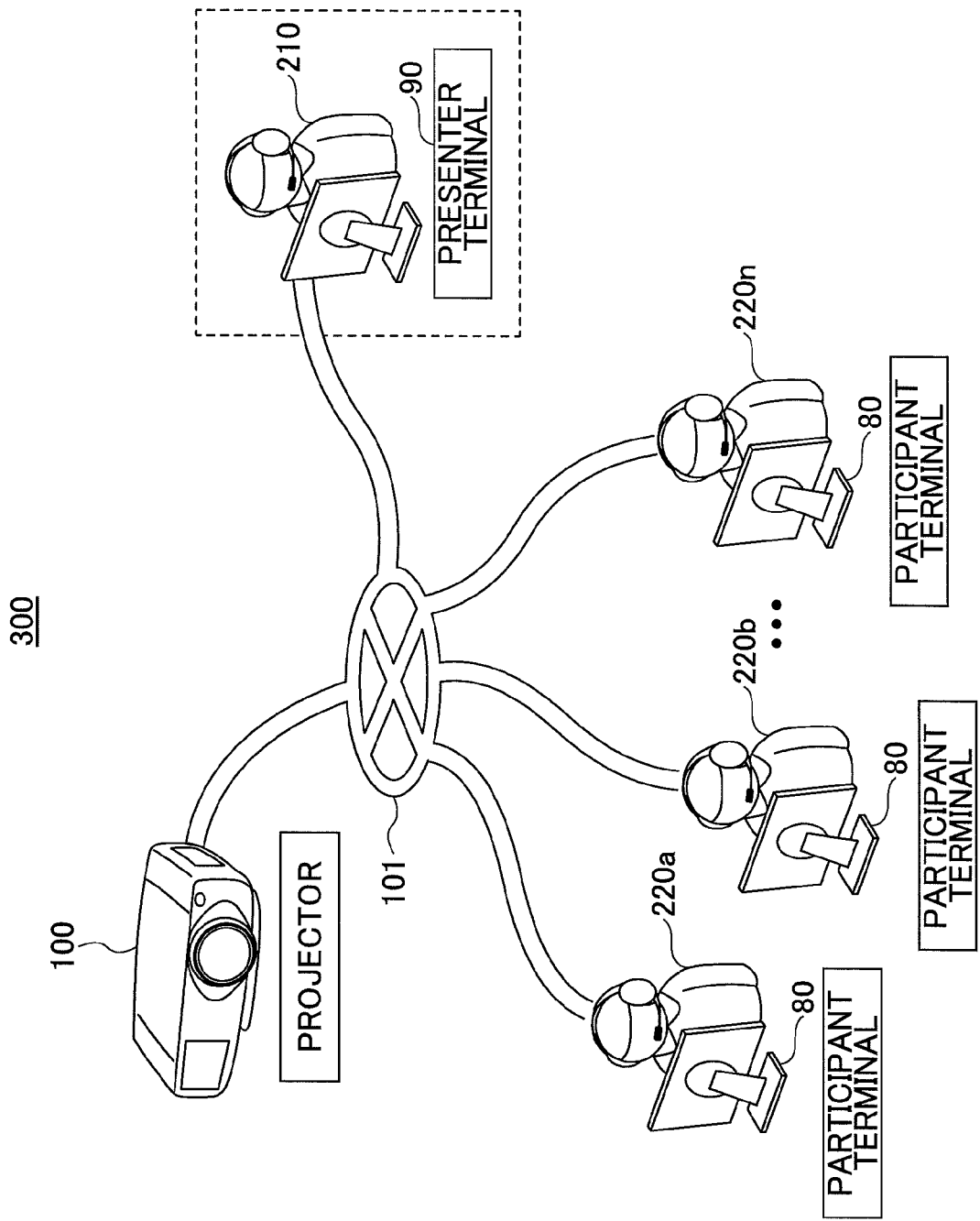
FIG. 3 is a schematic view showing an example of a structure of an image projection system of an embodiment.

FIG. 3 is a schematic view showing an example of a structure of an image projection system 300 (an example of a network system). The image projection system 300 includes one or more participant terminals 80 (an example of a second terminal), a presenter terminal 90 (an example of a first terminal) and a projector 100 (an example of an image projection apparatus) connected with each other via a network 101. One of the terminals connected to the projector 100 becomes a terminal operated by the presenter 210. However, the presenter may be changed in turn, so that the presenter terminal 90 may not be fixed. In the following, a terminal operated by the presenter 210 is referred to as the presenter terminal 90 and a terminal operated by the participant (220a, 220b, or 220n) is referred to as the participant terminal 80.

The network 101 may include an internal LAN, a wide area network (WAN), an IP-Virtual Private Network (IP-VPN), an INTERNET VPN, the INTERNET or the like. The network 101 may be any kind provided that the participant terminal 80 can communicate with the projector 100. Further, the network 101 may partially include a telephone network. Further, the network 101 may be wired or wireless.

The presenter terminal 90 generates the image file for projection 202 by processing the original image file 200 stored in a storing area of the presenter terminal 90 and sends the image file for projection 202 to the projector 100 via the network 101. The projector 100 projects the image file for projection 202 sent from the presenter terminal 90 via the network 101 on a projection surface such as a screen or the like.

The participants 220a, 220b and 220n, the presenter 210, and the projector 100 are present at a common space such as a conference room or the like. The participants 220a, 220b and 220n and the presenter 210 can see an image projected on the screen or the like. Further, the participants 220a, 220b and 220n and the presenter 210 can move to the projector 100 to operate the projector 100. The participant 220a, 220b and 220n can obtain an image file of an image projected by the projector 100 from the projector 100 by operating the participant terminal 80.

A server may be connected to the network 101 in order to strengthen the processing ability of the projector 100. In such a case, an image output interface of the projector 100 is connected to the server. Further in such a case, the server communicates with the presenter terminal 90 and the participant terminal 80 to obtain the image file from the presenter terminal 90 and to deliver the image file to the participant terminal 80.

Figure 4:
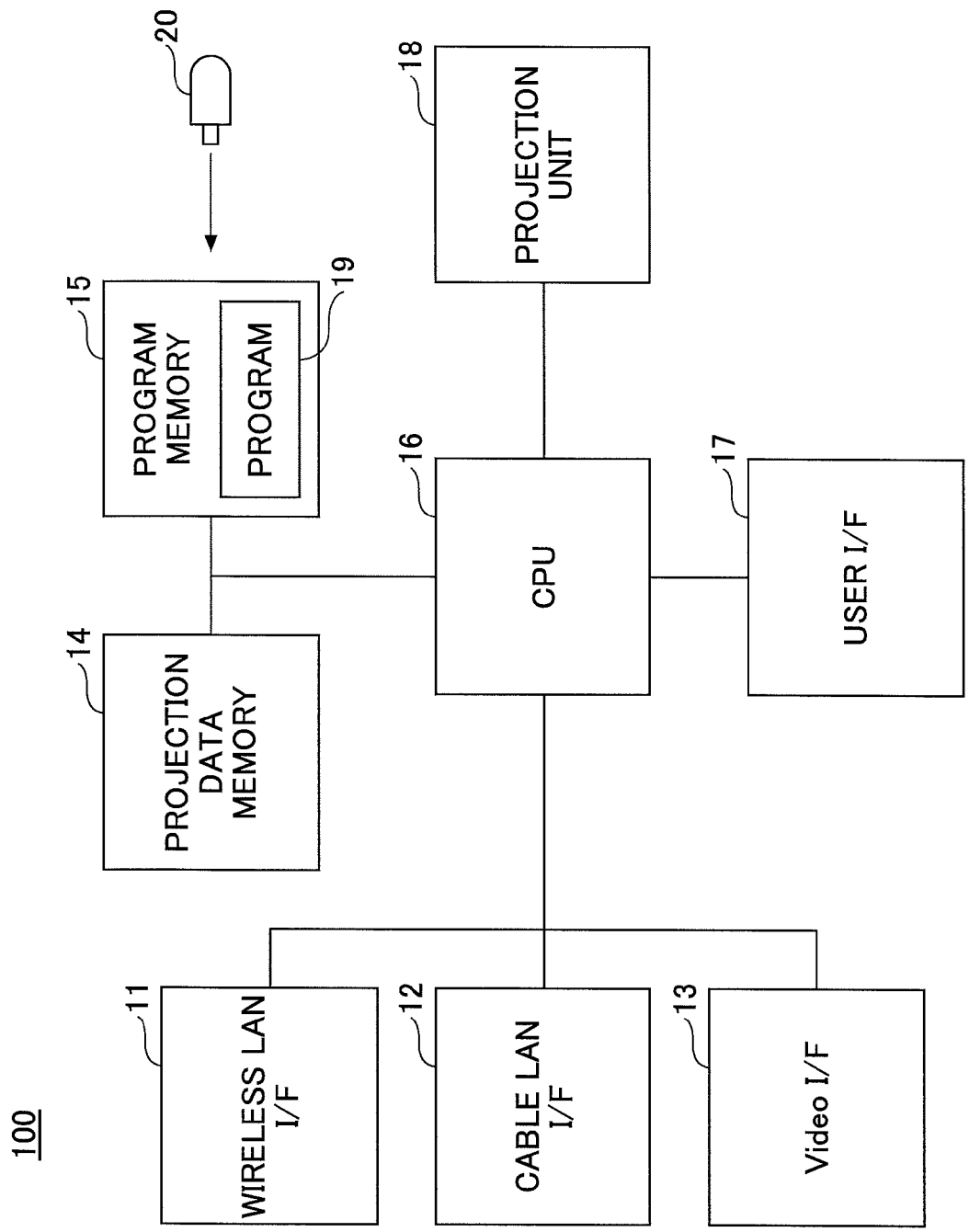
FIG. 4 is a block diagram of an example of a hardware structure of a projector.

FIG. 4 is a block diagram of an example of a hardware structure of the projector 100. The projector 100 includes a CPU 16, a projection data memory 14, a program memory 15, a projection unit 18, a user interface (I/F) 17, a wireless LAN I/F 11, a cable LAN I/F 12, and a Video I/F 13.

The CPU 16 controls the entirety of the projector 100. The projection data memory 14, the program memory 15, the projection unit 18, the user I/F 17, the wireless LAN I/F 11, the cable LAN I/F 12, and the Video I/F 13 are connected to the CPU 16. The connection structure shown in FIG. 4 is just an example, and the components such as the CPU 16 or the like may be connected with each other via a bus.

The user I/F 17 includes an operation unit that accepts an operation by a user to the projector 100, and a display unit that presents a status of the projector 100 to the user. The operation unit may be a keyboard, a switch, a touch panel, a voice input device or the like. The display unit may be an LED lamp, a liquid crystal or the like.

The projection unit 18 includes a projector lens, a condenser lens, a lamp, a mirror or the like. The optical system of the projection unit 18 may be as follows, for example. A light valve, an LED, a laser light or the like may be used as a light source. Further, a Digital Light Processing (DLP) element, a Liquid crystal on silicon (LCOS) panel and a MEMS mirror may be used as a polarization optical element for having light be projected on a plane.

The cable LAN I/F 12 is an interface for connecting to LAN by Ethernet (registered trademark) or the like. The wireless LAN I/F 11 is an interface for wirelessly connecting to a LAN in accordance with a standard such as IEEE 802.11a/b/g/n or the like. The projector 100 may further include a USB I/F for reading an image file from a USB memory, although not shown in the drawings.

The projection data memory 14 stores the image file for projection 202. The projection data memory 14 may be a rapid access memory such as a DRAM, a Ferroelectric RAM (FeRAM), a Magnetoresistive RAM (MRAM) or the like.

The program memory 15 stores a program 19 which is executed by the CPU 16 of the projector 100. The program memory 15 may be a ROM such as a flash memory. The projector 100 actualizes the various controls in accordance with an operation written in the program 19. The program 19 is provided in a state being stored in a storage medium 20, delivered via the network 101 from a server (not shown in the drawings), or the like.

The Video I/F 13 is an interface for inputting a video signal from a Personal Computer (PC, not shown in the drawings). There are various kinds of interfaces for inputting the video signal, and the Video I/F 13 may be D-sub, S-VIDEO or the like for an analog signal; HDMI, IEEE 1394, DVI, DisplayPort or the like for a digital signal.

Here, the projector 100 of the embodiment receives image files via the network 101. Thus, the Video I/F 13 is not basically used. In this point, the present embodiment is different from a case where a Video I/F of the PC and the Video I/F 13 of the projector 100 are directly connected so that a display displayed on a display unit of the PC is projected on a screen by the projector 100.

Figure 5:
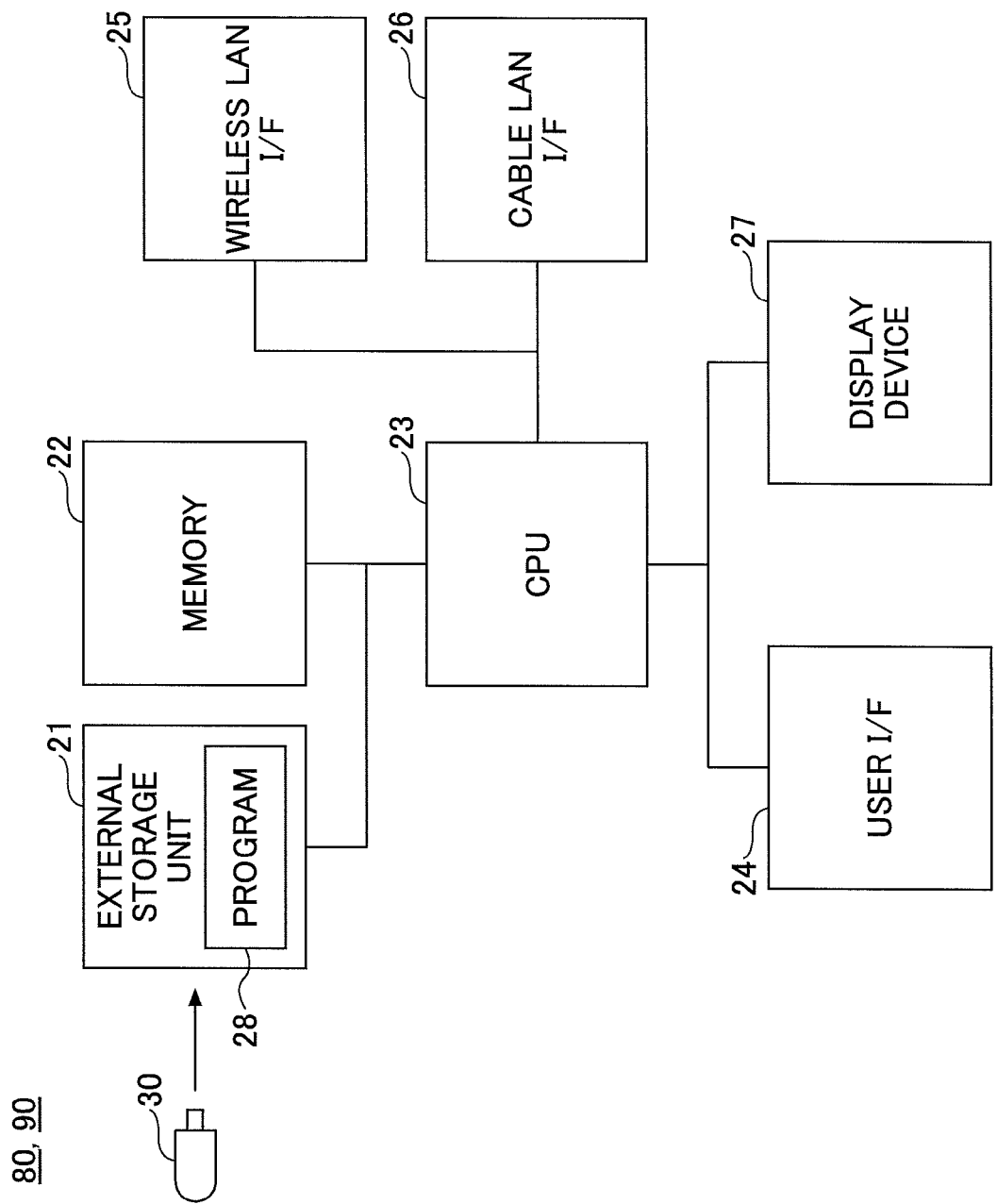
FIG. 5 is a block diagram of an example of a hardware structure of a presenter terminal or a participant terminal.

FIG. 5 is a block diagram of an example of a hardware structure of the presenter terminal 90 or the participant terminal 80. For the presenter terminal 90 or the participant terminal 80, a general PC may be used. Further, alternatively, a cellular phone, a smart phone, a tablet PC, a PDA or the like may be used as the presenter terminal 90 or the participant terminal 80.

The presenter terminal 90 or the participant terminal 80 includes an external storage unit 21, a memory 22, a CPU 23, a user I/F 24, a display device 27, a wireless LAN I/F 25, and a cable LAN I/F 26. The CPU 23 controls the entirety of the presenter terminal 90 or the participant terminal 80. The external storage unit 21, the memory 22, the user I/F 24, the display device 27, the wireless LAN I/F 25, and the cable LAN I/F 26 are connected to the CPU 23.

The external storage unit 21 is a non-volatile memory having a large volume such as a hard disk drive or a solid state drive, for example. The external storage unit 21 is not necessarily integrated with or directly connected to the presenter terminal 90 or the participant terminal 80, and may be a Network Attached Storage which is connected to the presenter terminal 90 or the participant terminal 80 via the network 101. The external storage unit 21 may store a program 28 which is executed by the CPU 23, the original image file 200 and the image file for projection 202.

Here, the memory 22 may include a RAM and a ROM. For example, the program 28 stored in the external storage unit 21 is loaded in the RAM, and the CPU 23 accesses the RAM to execute the program 28. One of the programs executed by the presenter terminal 90 or the participant terminal 80 is utility software. The utility software may be developed by a manufacturer of the projector 100 (or a third party having a relationship with the manufacturer). The utility software may be provided with the projector 100, or may be downloaded from a server by a user having a license of the projector 100. The projector 100 permits the presenter terminal 90 or the participant terminal 80 to communicate with the projector 100 by detecting or authenticating the utility software.

The user I/F accepts an operation of a user of the presenter terminal 90 or the participant terminal 80. The user I/F may be a keyboard, a pointing device (a mouse, a track ball, a touch pad), a touch panel, a voice input device or the like. The display device 27 includes a function of generating display information such as a predetermined resolution, a number of colors or the like and a function of a display. For a case when the presenter terminal 90 or the participant terminal 80 is a desktop PC, the function of the display may not be integrated. The display may be liquid crystal, organic EL, electronic paper or the like.

The cable LAN I/F 26 and the wireless LAN I/F 25 are the same as the cable LAN I/F 12 and the wireless LAN I/F 11 of the projector 100 and the explanation is not repeated.

(First Embodiment)

Figure 6:
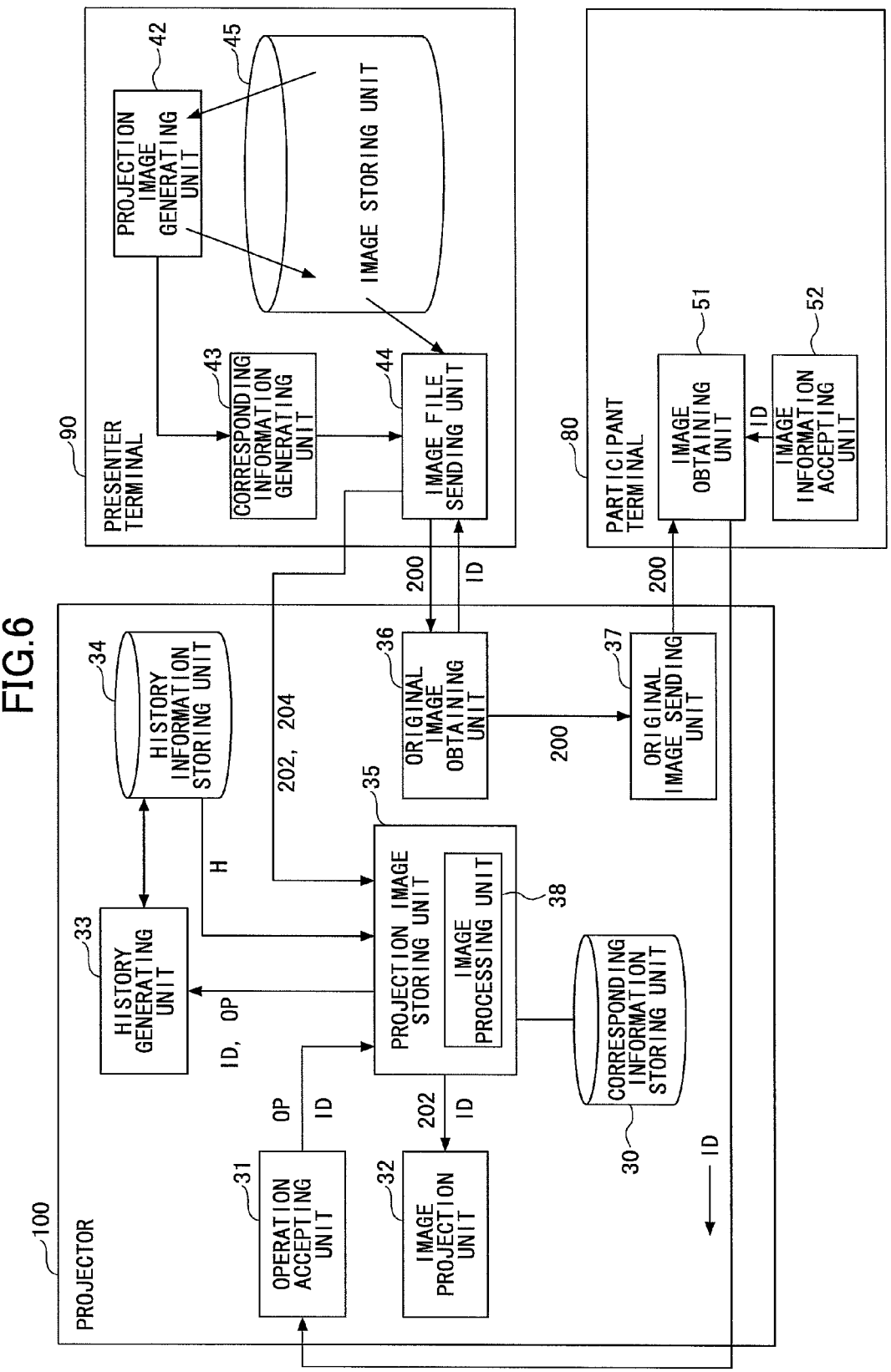
FIG. 6 is a block diagram showing an example of a functional structure of the image projection system of an embodiment.

FIG. 6 is a block diagram showing an example of a functional structure of the image projection system 300 of the embodiment. As described above, the image projection system 300 includes the projector 100, the presenter terminal 90, and the participant terminal 80.

(Presenter Terminal 90)

The presenter terminal 90 includes a projection image generating unit 42, a corresponding information generating unit 43, an image file sending unit 44, and an image storing unit 45. These functions are actualized by cooperation of the hardware and the program (utility software) executed by the CPU 23 of the presenter terminal 90.

The image storing unit 45 stores the original image file 200. Further, the image storing unit 45 may store the image file for projection 202 which is generated from the original image file 200 temporarily or with the original image file 200.

The projection image generating unit 42 generates the image file for projection 202 from the original image file 200, selected by the presenter 210 for projection, into a form applicable to the projector 100. The presenter terminal 90 may send an inquiry about the format of an image file capable of being handled by the projector 100 to the projector 100. Alternatively, the presenter 210 may set the format of the image file capable of being handled by the projector 100 in the presenter terminal 90.

Whether the projector 100 can handle the image file may depend on the format of the image file. Further, when the number of pixels or file size of the image file is extremely large, even if the projector 100 can handle the image file, it may take time to process or send the image file. Thus, the projection image generating unit 42 converts the format of the image file to a format capable of being handled by the projector 100, and further image processes to reduce the number of pixels or the file size of the image file to be less than a predetermined value.

In the following, all of these conversions of the image file are simply referred to as a "conversion for projection". The conversion for projection may generally lower the image quality of the image file. However, there may be a case when it is unnecessary to generate the image file for projection 202.

For example, when a format of the image file for projection 202 applicable to the projector 100 is JPEG, and a format of the original image file 200 stored in the image storing unit 45 is BMP, the projection image generating unit 42 converts the format from BMP to JPEG.

Further, when an image size of the image file for projection 202 applicable to the projector 100 is WXGA (1280×800), XGA (1024×768), SVGA (800×600), or VGA (640×480), and a size of the original image file 200 stored in the image storing unit 45 is SXGA (1280×1024), the projection image generating unit 42 converts the size of the original image file 200 to the closest image size, for example, to WXGA (1280×800). Further, in order to equalize the image size of image files to be projected, the image file may be converted to a predetermined resolution (for example, SVGA). A method of reducing the image size of the image file may be bilinear convolution, bi-cubic convolution or the like. In this embodiment, even when the image file for projection 202 is generated, the original image file 200 is not deleted.

Alternatively, the projection image generating unit 42 may increase the resolution of the image file. With this operation, an image file with a smaller number of pixels may be converted to have a resolution higher than the original image file to be projected. For a method of converting an image file to high resolution, bi-cubic convolution, nearest neighbor method or the like may be used.

Further, when the number of pixels or file size is more than or equal to a predetermined value, the projection image generating unit 42 reduces the number of pixels or file size of the image file. Specifically, the method includes increasing a compression ratio, lowering a color tone or the like. The compression ratio can be changed by a format of JPEG or PDF. The color tone can be changed by, for example, changing a number of colors for 1 pixel from 8 bits to 4 bits for each of RGB.

For the compression ratio, for the case when the image file is of JPEG, if compression ratio is written in a file header, the value may be used to determine whether the compression ratio is too small and if the compression ratio is too small, the compression ratio may be made larger to compress the original image file 200. With this operation, the file size can be reduced. Further, regardless of the original compression ratio, the projection image generating unit 42 may compress the original image file 200 such that the file size of the image file for projection 202 becomes less than a predetermined value.

The projection image generating unit 42 stores the image file for projection 202 and the original image file 200 in the image storing unit 45 in a corresponding manner. The original image file 200 and the image file for projection 202 are identified by a unique image ID, respectively. The image ID may be added in addition to a file name of the original image file 200 and the image file for projection 202 by utility software, or the file names of the original image file 200 and the image file for projection 202 may be used as the image ID. When the file name is used as the image ID, the file name can be uniquely identified in a same folder by the file system. In this embodiment, in order to simplify the operation, the file name is used as the image ID. Thus, the original image file 200 and the image file for projection 202 are stored in different folders.

"Correspondence of the image file for projection 202 and the original image file 200" means that when the image ID of one of the image file for projection 202 and the original image file 200 is assigned, the image ID of the other of the image file for projection 202 and the original image file 200 is uniquely determined. In this embodiment, the image file for projection 202 and the original image file 200 are stored in different folders while having the image ID of the image file for projection 202 to be the same as that of the original image file 200. With this structure, when the image ID of the image file for projection 202 is assigned, the image ID of the original image file 200 can be recognized. Further, when the image ID, different from that of the original image file 200, is assigned to the image file for projection 202, both of the corresponding image IDs are stored in a table or the like.

The corresponding information generating unit 43 generates the corresponding information 204 in which the image ID of the image file for projection 202 and the IP address of the presenter terminal 90 (own terminal) correspond with each other. The corresponding information 204 is sent to the projector 100 with the image file for projection 202.

Thus, the projector 100 can specify the presenter terminal 90 that sends the image file for projection 202 based on the corresponding information 204.

The corresponding information generating unit 43 resisters a delivering permit flag for the corresponding information 204 upon accepting a setting from the presenter 210. The delivering permit flag indicates whether the presenter 210 permits delivering the original image file 200. The delivering permit flag may be structured to include information indicating whether the image file for projection 202 is permitted to be delivered.

The image file sending unit 44 (an example of a first sending unit and a second sending unit) sends the image file for projection 202 (or the original image file 200) with the corresponding information 204. Further, when the projector 100 sends a request for delivering the original image file 200 with the image ID of the image file for projection 202, the image file sending unit 44 reads the original image file 200 which corresponds with the image ID from the image storing unit 45. Then, the image file sending unit 44 sends the read original image file 200 to the projector 100.

(Participant Terminal 80)

The participant terminal 80 includes an image information accepting unit 52 and an image obtaining unit 51. These functions are actualized by a cooperation of the hardware and the program (utility software) executed by the CPU 23 of the participant terminal 80.

The image information accepting unit 52 accepts image information (document ID, IP address of the projector 100 if necessary) for specifying the image file for projection 202 from the participant (for example 220a). The document ID may be same as the image ID of the image file for projection 202, or an ID by which the projector 100 can specify the image ID of the image file for projection 202.

The image obtaining unit 51 obtains the original image file 200 corresponding to the image file for projection 202 projected by the projector 100 from the projector 100.

(Projector 100)

The projector 100 includes a corresponding information storing unit 30, an operation accepting unit 31, an image projection unit 32, a history generating unit 33, a history information storing unit 34, a projection image storing unit 35, an original image obtaining unit 36, and an original image sending unit 37. These functions are actualized by a cooperation of the hardware and the program executed by the CPU 16 of the projector 100.

The corresponding information storing unit 30 stores the corresponding information 204.

The operation accepting unit 31 accepts magnifying operations or the like from the user. The operation accepting unit 31 receives a request for delivering the original image file 200 from the participant terminal 80.

The projection image storing unit 35 stores the obtained image file. The projection image storing unit 35 stores the obtained corresponding information 204 in the corresponding information storing unit 30. The projection image storing unit 35 has a function to perform a control operation based on the corresponding information 204 and the history information, in addition to a static function as a storing unit of the image files. The projection image storing unit 35 includes an image processing unit 38 that performs image processing on the image file for projection 202.

The image projection unit 32 outputs the image file stored in the projection image storing unit 35 to the projection unit 18 and projects it. As the image file is sent in a form of a predetermined format such as JPEG, PDF or the like, the image projection unit 32 decodes the image file to convert to bit map data to be stored in the projection data memory 14. Then, the image projection unit 32 has the projection unit 18 to project the image file.

The history generating unit 33 generates a projection history and history information in which an operation history is recorded for the image file for projection 202.

The original image obtaining unit 36 sends a request for delivering the original image file 200 to the presenter terminal 90 specified by the IP address corresponding to the image ID in the corresponding information 204, and obtains the original image file 200 from the presenter terminal 90.

The original image sending unit 37 delivers the original image file 200 obtained by the original image obtaining unit 36 to the participant terminal 80.

(Information)
(Corresponding Information 204)

Figure 7:
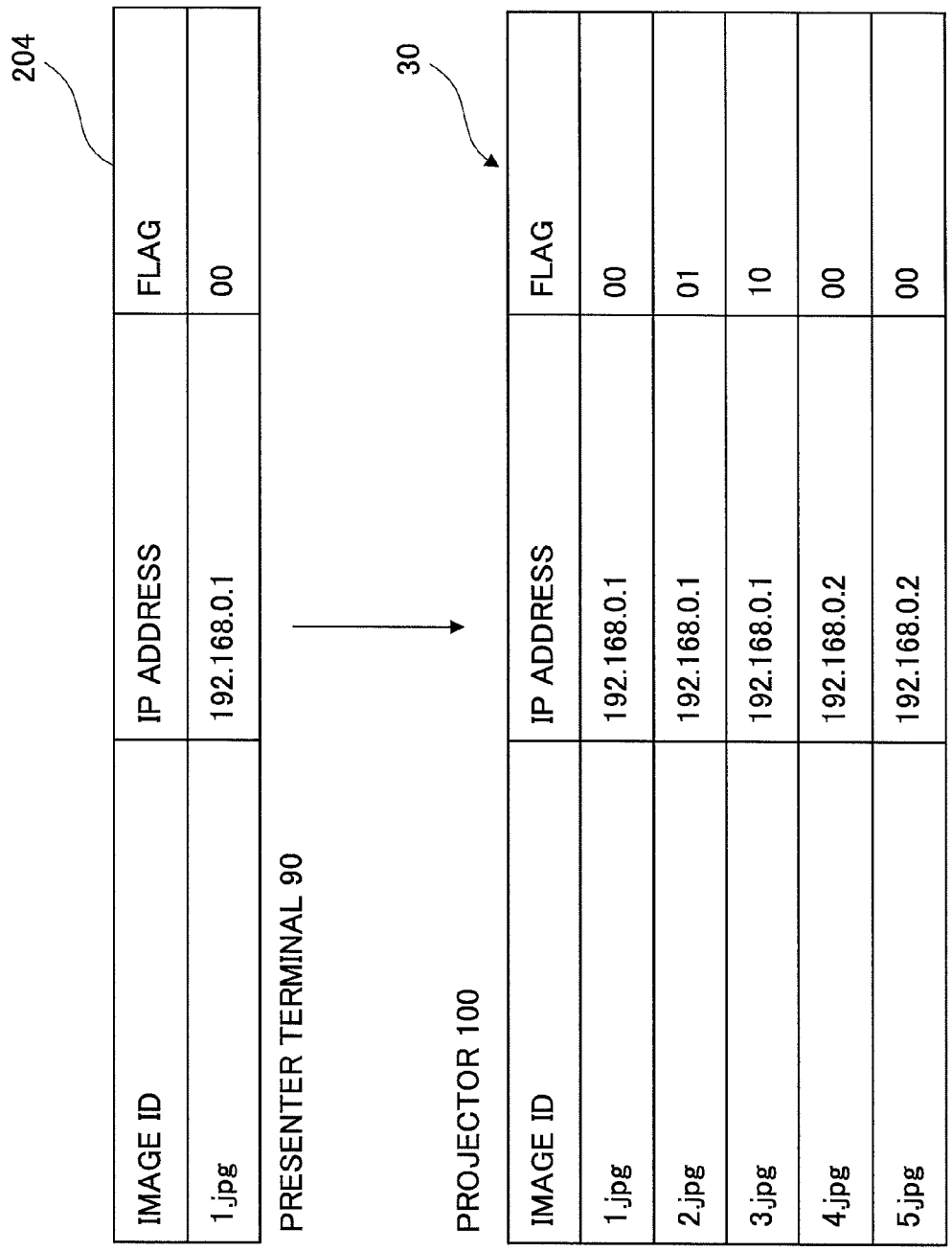
FIG. 7 is a view showing an example of corresponding information of an embodiment.

FIG. 7 is a view showing an example of the corresponding information 204. The presenter terminal 90 generates the corresponding information 204 as a record and sends it to the projector 100 with the image file for projection 202. The corresponding information storing unit 30 of the projector 100 stores a predetermined number of the records. The corresponding information 204 includes, for example, items such as "image ID of image file for projection" (just shown as "IMAGE ID" in FIG. 7), "IP address of presenter terminal" (just shown as "IP ADDRESS" in FIG. 7), and "delivering permit flag" (just shown as "FLAG" in FIG. 7).

The "image ID of image file for projection" is an image ID for uniquely specifying the image file for projection 202 obtained from the presenter terminal 90.

The "IP address of presenter terminal" is an IP address of the presenter terminal 90 which sends the image file for projection 202. Alternatively, a MAC address of the presenter terminal 90, or a user name of the presenter terminal 90 or the like may be used instead of the IP address of the presenter terminal 90 provided that the presenter terminal 90 can be uniquely identified. For example, in FIG. 7, there are two kinds of IP address in "IP address of presenter terminal"; this means that there are two presenters.

When there are plural presenter terminals, the "image ID of image file for projection" may overlap. However, as "IP address of presenter terminal" is unique, the projector 100 can uniquely specify the image file for projection 202 by a combination of the image ID and the IP address of presenter terminal.

The "delivering permit flag" indicates whether it is permitted to deliver the image file to the participant terminal 80. For example, "00" means that both the original image file 200 and the image file for projection 202 are permitted to be delivered, "01" means that only the image file for projection 202 is permitted to be delivered, and "10" means the original image file 200 and the delivering of the image file for projection 202 are prohibited to be delivered. Whether it is permitted to deliver the image file to the participant terminal 80 may be set by the presenter in the presenter terminal 90.

(History Information)

FIG. 8 is a view showing an example of the history information. The history information includes, for example, items such as "image ID of image file for projection" (just shown as "IMAGE ID" in FIG. 8), "display start time", "display end time", and "operation history".

The "image ID of image file for projection" is the image ID of the image file for projection 202 sent from the presenter terminal 90.

The "display start time" is a time when the projector 100 started projecting the image file for projection 202, and the "display end time" is a time when the projector 100 ended projecting the image file for projection 202. A display period of the image file for projection 202 may be calculated from a difference between the times of the "display start time" and the "display end time".

The "operation history" includes "content of operation" (just shown as "OPERATION CONTENT" in FIG. 8) which is a specific content of an operation performed to the projector 100. In the "content of operation", a content of the operation which is accepted by the user I/F 17 of the projector 100 is recorded. The content of the operation includes, for example, magnification, contraction, and brightness control of the projected image. The time when the operation is performed may also be recorded.

Here, an operation command may be sent to the projector 100 via the network 101 from the participant terminal 80 or the presenter terminal 90. In this case, the IP address of the participant terminal 80 or the presenter terminal 90 which sends the operation command is recorded in the content of operation as well.

(Communication)

The projector 100, the presenter terminal 90 and the participant terminal 80 communicate with each other via the cable LAN or the wireless LAN as described above. For communications in the LAN, Ethernet (registered trademark) is often used. For the Ethernet (registered trademark), the cable LAN I/F 12 or the wireless LAN I/F 11 obtains the MAC address and the IP address of each of the apparatuses by a protocol such as ARP or the like. On the Ethernet (registered trademark) LAN, an IP layer that decomposes and reconstructs packets, a TCP layer that controls communication, and an application layer that processes data exist. The IP layer and the TCP layer are processed by a TCP/IP protocol stack provided by an OS, for example. The IP header used in the IP layer includes IP addresses of sender and receiver. The TCP header used in the TCP layer includes a sender port number and a receiver port number. The TCP/IP protocol stack determines application software for passing the received data based on the port number.

In this embodiment, the projector 100, the presenter terminal 90 and the participant terminal 80 may use any application software in communication. For example, for a browser or file transfer software, HTTP or FTP which is a protocol of the application layer is used. The participant terminal 80 may send a request for delivering the image file by sending an IP address to the projector 100 by the OS or file management software which uses a protocol for sharing a file via the network such as Server Message Block (SMB) (where a lower layer of SMB is NetBIOS, not TCP/IP). Further, the participant terminal 80 may send and receive the image file by interprocess communication using RPC protocol.

(Operation)

(Operation Until Projection)

Figure 9:
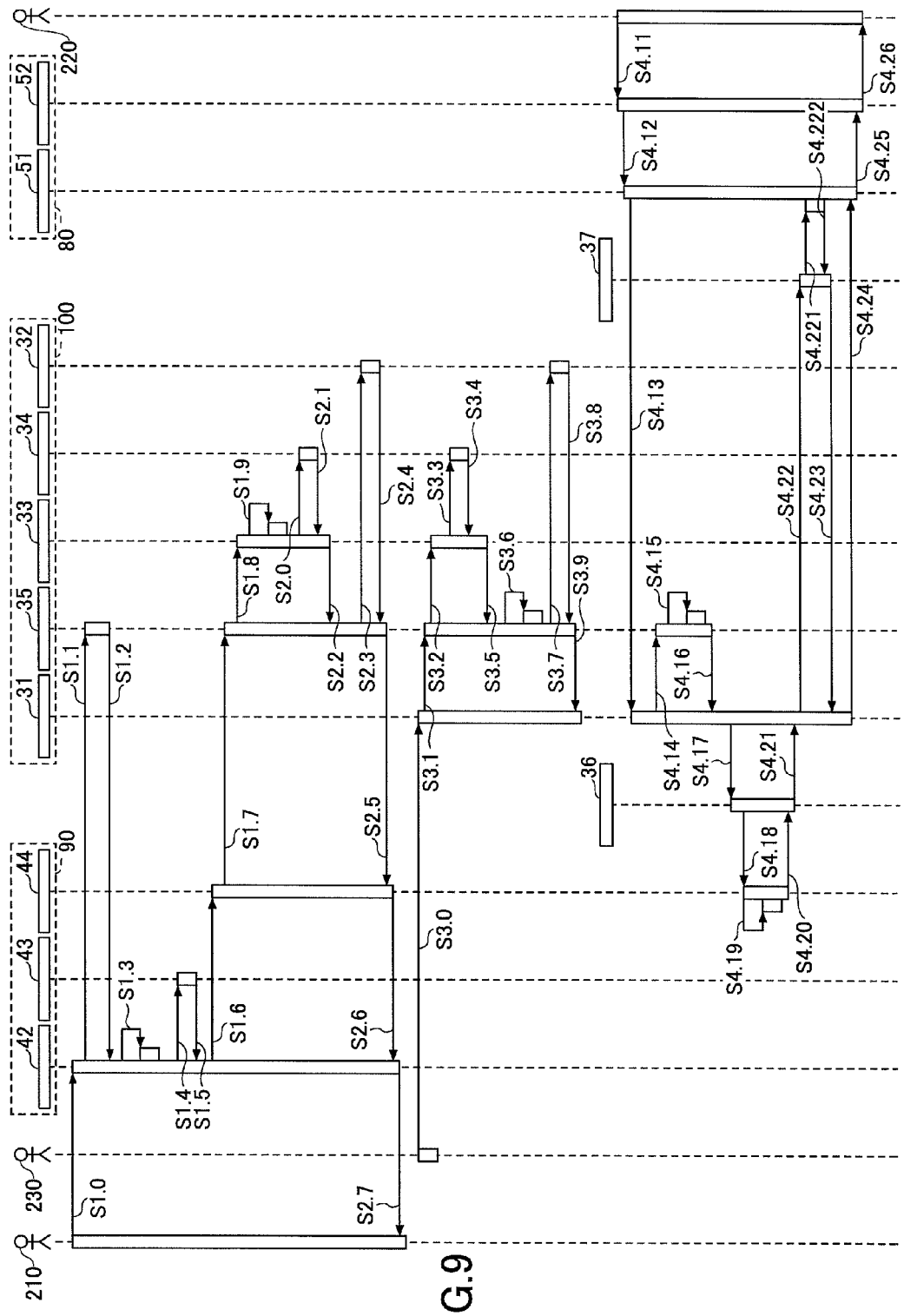
FIG. 9 is a sequence diagram showing an example of an operation of the projector, the participant terminal and the presenter terminal of an embodiment.

FIG. 9 is a sequence diagram showing an example of an operation of the projector 100, the participant terminal 80 and the presenter terminal 90. In this case, it is assumed that the programs (the functional structures) of the presenter terminal 90 and the participant terminal 80 previously specify (obtain) the IP addresses with each other.

s1.0: The presenter 210 operates the presenter terminal 90 to project an image.

Figure 10A:
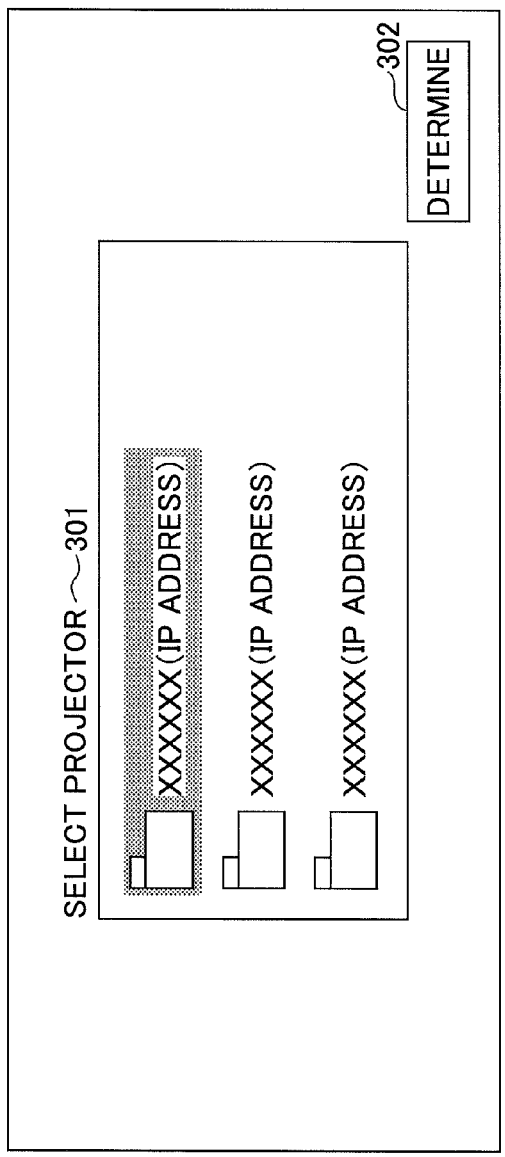
FIG. 10A is a view showing an example of a projector selection screen displayed on a display device of the presenter terminal.

FIG. 10A is a view showing an example of a projector selection screen displayed on the display device 27 of the presenter terminal 90. The program of the presenter terminal 90 displays IP addresses or projector names of detected projectors (including the projector 100). As shown in FIG. 10A, plural IP addresses or projector names may be displayed. Further, a message 301 indicating "select projector" is displayed in the screen. Thus, the presenter 210 selects one of the projectors, in this case the projector 100, which is previously known. Thus, the projector 100 to which the presenter terminal 90 sends the image file for projection 202 is specified.

Figure 10B:
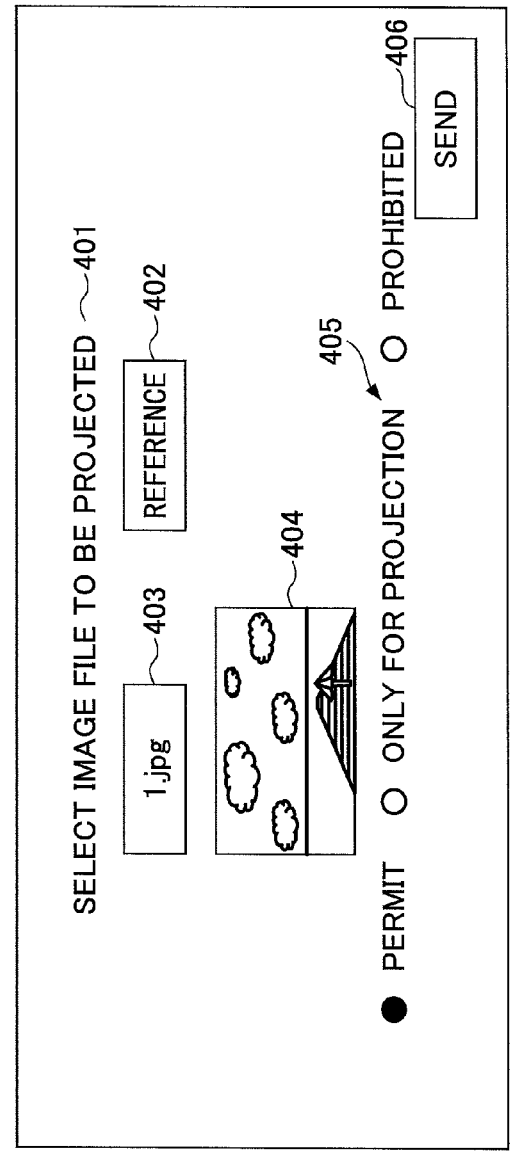
FIG. 10B is a view showing an example of an image file selection screen displayed on a display device of the presenter terminal.

FIG. 10B is a view showing an example of an image file selection screen displayed on the display device 27 of the presenter terminal 90. When the presenter wants to project an image file, the presenter operates the user I/F 24 of the presenter terminal 90 to display an image file selection screen on the presenter terminal 90. In the image file selection screen, a message 401 indicating "select image file to be projected" is included.

The presenter operates the user I/F 24 to push a reference button 402 for selecting the original image file 200. The program of the presenter terminal 90 displays a tree structure and file names of original image files (including the original image file 200) of each folder on the display device 27. The presenter selects the original image file 200 from the tree structure. The file name of the original image file 200 which is selected by the presenter to be projected is displayed in a file name box 403. Further, the program of the presenter terminal 90 may display a thumbnail 404 of the original image file 200 with the file name.

Further, the image file selection screen includes radio buttons 405 indicating "permit", "only for projection", "prohibited" and the like. The presenter selects whether it is permitted to deliver the original image file 200 or the image file for projection 202 to the participant terminal 80 by the radio buttons 405. When the presenter selects the "permit delivering", the original image file 200 and the delivering of the image file for projection 202 are permitted to be delivered. When the presenter selects the "permit only for projection", only the image file for projection 202 is permitted to be delivered. When the presenter selects the "prohibited", both the original image file 200 and the delivering of the image file for projection 202 are prohibited from being delivered.

When the presenter pushes a send button 406, the projection image generating unit 42 accepts selection of the original image file 200 to be projected and a setting of whether it is permitted to deliver the original image file 200 or the image file for projection 202.

Referring back to FIG. 9, the following operation is performed.

s1.1: The projection image generating unit 42 queries the projector 100 (the projection image storing unit 35, for example) about a file format, an image size or the like applicable to the projector 100.

s1.2: The projector 100 sends the file format, the image size or the like applicable to the projector 100 to the projection image generating unit 42. The projector 100 may send information as follows.

file format: JPEG, BMP image size (maximum): 640×480 file size: 1M byte s1.3: The projection image generating unit 42 converts the original image file 200 to the file format, the image size, the file size or the like applicable to the projector 100. With this operation, the image file for projection 202 is generated. Then, the original image file 200 and the image file for projection 202 are stored in the image storing unit 45 in a corresponding manner.

s1.4: Next, the projection image generating unit 42 requests the corresponding information generating unit 43 to generate the corresponding information 204. When requesting, the projection image generating unit 42 reports the image ID of the image file for projection 202, the setting of permission of delivery to the corresponding information generating unit 43. The corresponding information generating unit 43 generates the corresponding information 204 based on the image ID of the image file for projection 202, the setting of permission of delivery and IP address of own terminal (the presenter terminal 90).

s1.5: The projection image generating unit 42 obtains the corresponding information 204.

s1.6: The projection image generating unit 42 sends the image file for projection 202 with the corresponding information 204 to the image file sending unit 44.

s1.7: The image file sending unit 44 sends the image file for projection 202 with the corresponding information 204 to the projector 100.

s1.8: The projection image storing unit 35 receives the image file for projection 202 and the corresponding information 204, and requests the history generating unit 33 to generate the history information. When requested, the projection image storing unit 35 sends the corresponding information 204 to the history generating unit 33.

s1.9: The history generating unit 33 records the image ID of the image file for projection 202 and a display start time to generate the history information. When the history generating unit 33 generates new history information, the history generating unit 33 records a current time in the "display end time" of the history information of the current image file for projection.

s2.0: The history generating unit 33 stores the history information in the history information storing unit 34.

s2.1: The history information storing unit 34 sends the recorded result to the history generating unit 33.

s2.2: The history generating unit 33 sends the generated result of the history information to the projection image storing unit 35.

s2.3: The projection image storing unit 35 of the projector 100 sends the image file for projection 202 to the image projection unit 32 to project the image. With this operation, the image projection unit 32 decodes the image file for projection 202 to project on the screen or the like. The image projection unit 32 projects the last-sent image file for projection 202.

The projection image storing unit 35 sends document ID of the image file for projection 202 and an IP address of the projector 100 to the projection unit 18. Thus, the image projection unit 32 of the projector 100 displays (projects) the IP address and the document ID with the image. With this operation, a participant can recognize the IP address of the projector 100 to which a request is to be sent and the document ID when sending a request for delivering the original image file 200.

s2.4: The image projection unit 32 sends the projected result to the projection image storing unit 35.

s2.5: The projection image storing unit 35 sends the projected result to the image file sending unit 44 of the presenter terminal 90.

s2.6: The image file sending unit 44 sends the projected result to the projection image generating unit 42.

s2.7: The projection image generating unit 42 reports the projected result to the presenter 210.

Figure 11:
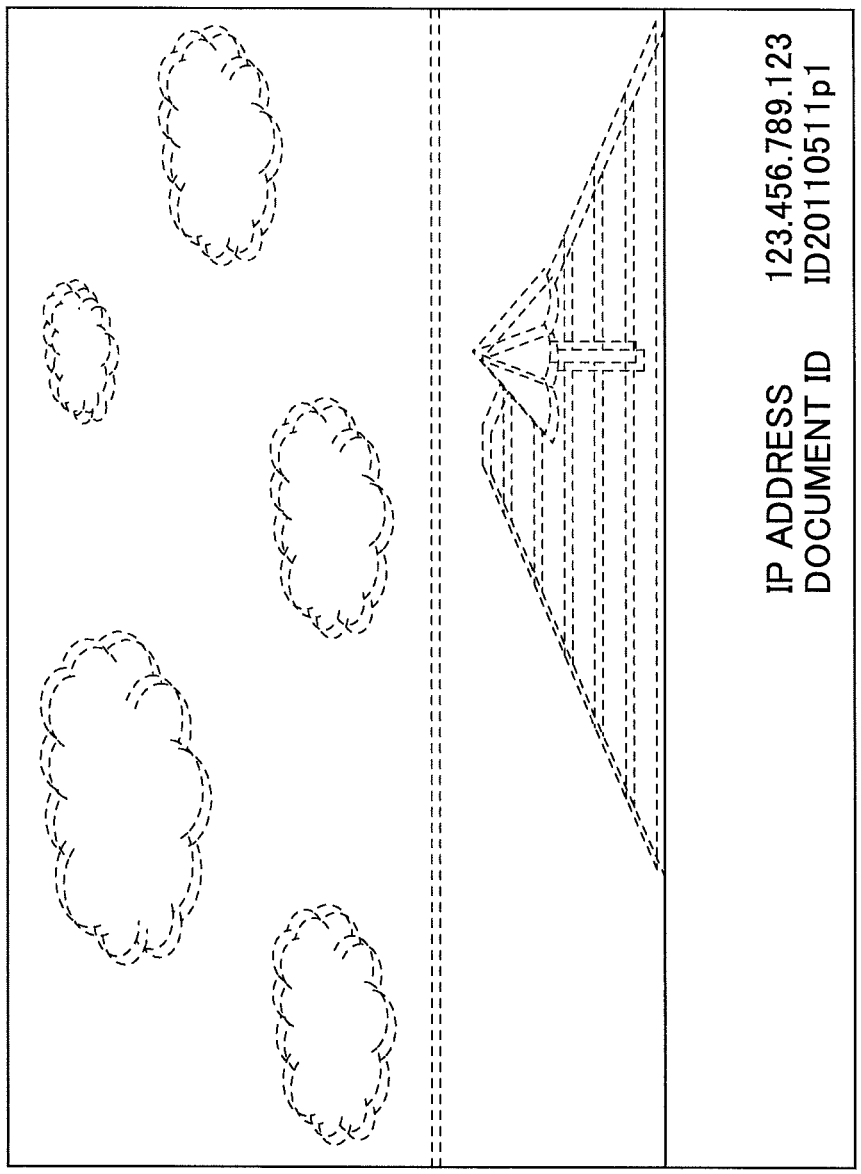
FIG. 11 is a view showing an example of a display projected by the projector.

FIG. 11 is a view showing an example of a display projected by the projector 100. The image file for projection 202 is visualized by visible light. Further, the IP address of the projector 100 and the document ID are shown at the lower part. The document ID is an identifier for the projector 100 to uniquely identify the image file for projection 202. The document ID may be the image ID of the image file for projection 202, or a combination of date and the image ID of the image file for projection 202 as shown, for example. When the latter case is used, the projector 100 stores the correspondence between the document ID and the image ID. Further, the date may include the time as well. Further, as described above, when there are plural presenter terminals, the "image ID of image file for projection" may overlap. Therefore, the document ID may be a combination of the image ID and the IP address of presenter terminal or the like.

(Operation after Projection)

There may be a case when an operator 230 (the participant 220, the presenter 210 or the like) operates the user I/F 17 of the projector 100 to magnify the image because it is not clearly displayed, for example. The projector 100 of the embodiment records this operation in the history information.

Referring back to FIG. 9, the following operation is performed.

s3.0: First, the operator 230 (the participant 220, the presenter 210 or the like) operates the user I/F 17 of the projector 100 to magnify the image.

s3.1: The operation accepting unit 31 reports the content of operation of the projection image storing unit 35.

s3.2: The projection image storing unit 35 reports the content of operation and the image ID of the image file for projection 202 of currently projected to the history generating unit 33.

s3.3: The history generating unit 33 specifies the record of the history information based on the image ID and records the content of operation in the history information storing unit 34.

s3.4: The history information storing unit 34 sends the recorded result to the history generating unit 33.

s3.5: The history generating unit 33 sends the generated result of the history information to the projection image storing unit 35.

s3.6: The projection image storing unit (image processing unit 38) performs magnifying the image file for projection 202. This operation is called digital zoom in which a predetermined area of the image file for projection 202 is trimmed based on the magnification scale assigned by the operator 230 and the part of the image file for projection 202 is magnified by interpolating the pixels.

s3.7: The projection image storing unit 35 sends the magnified image file for projection 202 and requests projecting the image to the image projection unit 32. The image projection unit 32 displays the magnified image of the last-sent image file for projection 202 instead of the last-sent image file for projection 202. Here, even when the image is magnified, the image ID of the image file for projection 202 is not changed so that the current time is not recorded in the "display end time" of the image file for projection 202 of the history information.

s3.8: The image projection unit 32 sends the projected result to the projection image storing unit 35.

s3.9: The projection image storing unit 35 sends the projected result to the operation accepting unit 31.

(Operation of Obtaining Original Image File 200 by Participant Terminal 80)

When the participant 220 wants to obtain the original image file 200 of the image projected by the projector 100, the participant 230 can obtain the original image file 200 by using the participant terminal 80.

s4.11: The participant 220 operates the participant terminal 80 to obtain the original image file 200. The program of the participant terminal 80, similar to the presenter terminal 90, is capable of connecting to the projector 100 by the IP address of the projector 100. Further, the participant may input the IP address of the projector 100, which is projected by the projector 100 to connect the participant terminal 80 to the projector 100.

Figure 12A:
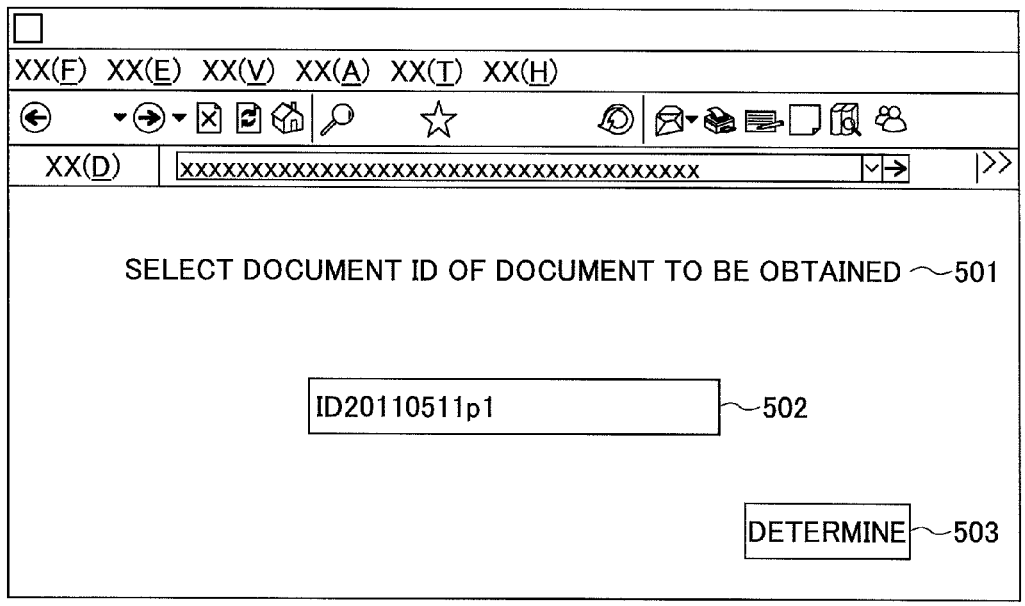
FIG. 12A is a view showing an example of an image information input display displayed on a display device of the participant terminal.

FIG. 12A is a view showing an example of an image information input display displayed on the display device 27 of the participant terminal 80. The image information input display includes a message 501 indicating "select document ID of document to be obtained". The participant selects the document ID projected by the projector 100 and inputs the document ID in an ID input box 502 by using the user I/F 24 of the participant terminal 80. When the participant pushes a determination button 503, the image information accepting unit 52 accepts the document ID.

s4.12: The image information accepting unit 52 sends the document ID and requests obtaining the original image file 200 to the image obtaining unit 51.

s4.13: The image obtaining unit 51 sends the request for delivering the original image file 200 with the document ID to the operation accepting unit 31 of the projector 100.

s4.14: The operation accepting unit 31 sends the document ID and a request for the IP address of the presenter terminal 90 to the projection image storing unit 35.

s4.15: The projection image storing unit 35 converts the document ID to the image ID, if necessary, and reads the IP address of the presenter terminal 90 corresponding to the image ID in the corresponding information 204. The projection image storing unit 35 refers to the corresponding information 204 and determines whether the original image file 200 specified by the image ID is permitted to be delivered.

s4.16: The operation accepting unit 31 obtains the IP address of the presenter terminal 90 from the projection image storing unit 35.

s4.17: The operation accepting unit 31 sends the IP address of the presenter terminal 90 and the image ID to the original image obtaining unit 36 and requests obtaining the original image file 200.

s4.18: The original image obtaining unit 36 selects the IP address of the presenter terminal 90, sends the image ID to the image file sending unit 44 of the presenter terminal 90 and requests obtaining the original image file 200.

s4.19: The image file sending unit 44 reads the original image file 200 from the image storing unit 45 based on the image ID.

s4.20: The image file sending unit 44 sends the original image file 200 to the original image obtaining unit 36.

s4.21: The original image obtaining unit 36 sends the original image file 200 to the operation accepting unit 31.

s4.22: The operation accepting unit 31 sends the original image file 200 to the original image sending unit 37.

s4.221 to s4.222: The original image sending unit 37 sends the original image file 200 to the participant terminal 80. The original image sending unit 37 generates an HTML file including the original image file 200, for example, and sends it to the participant terminal 80. Alternatively, the original image file 200 itself may be sent.

s4.23: The original image sending unit 37 reports the sent result of the original image file 200 to the operation accepting unit 31.

s4.24: The operation accepting unit 31 reports the completion of sending the original image file 200 to the image obtaining unit 51.

s4.25: The image obtaining unit 51 reports received result of the original image file 200 to the image information accepting unit 52.

s4.26: The image information accepting unit 52 reports the received result of the original image file 200 to the participant 220.

Figure 12B:
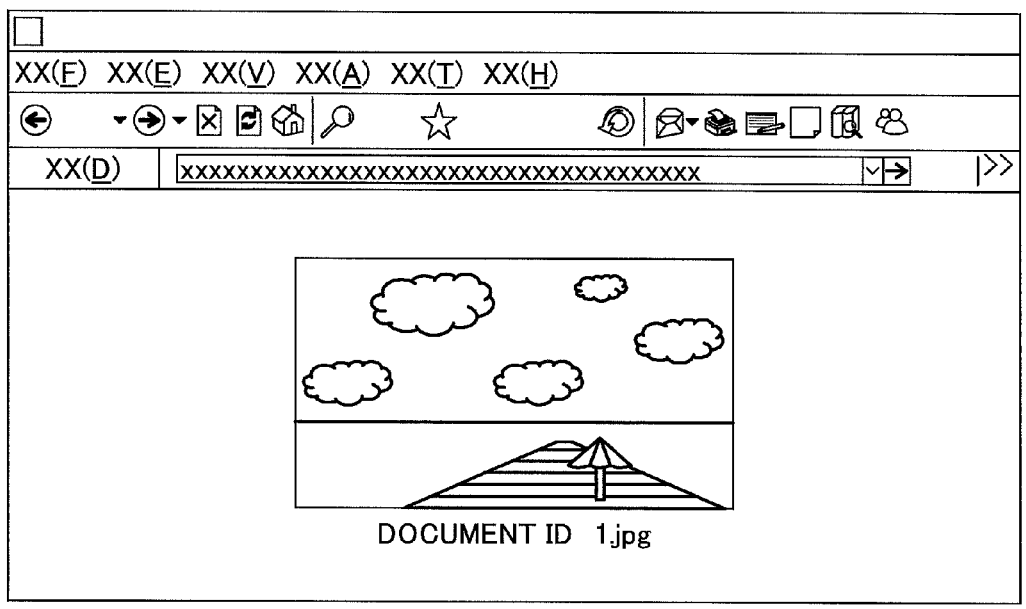
FIG. 12B is a view showing an example of an original image file displayed on a display device of the participant terminal.

FIG. 12B is a view showing an example of the original image file 200 displayed on the display device 27 of the participant terminal 80. The browser of the participant terminal 80, for example, displays the original image file 200. With this operation, the participant 220 can obtain the original image file 200 of the image projected by the projector 100. Thus, the participant 220 can print the image file whose image quality is not lowered for projection.

Figure 13:
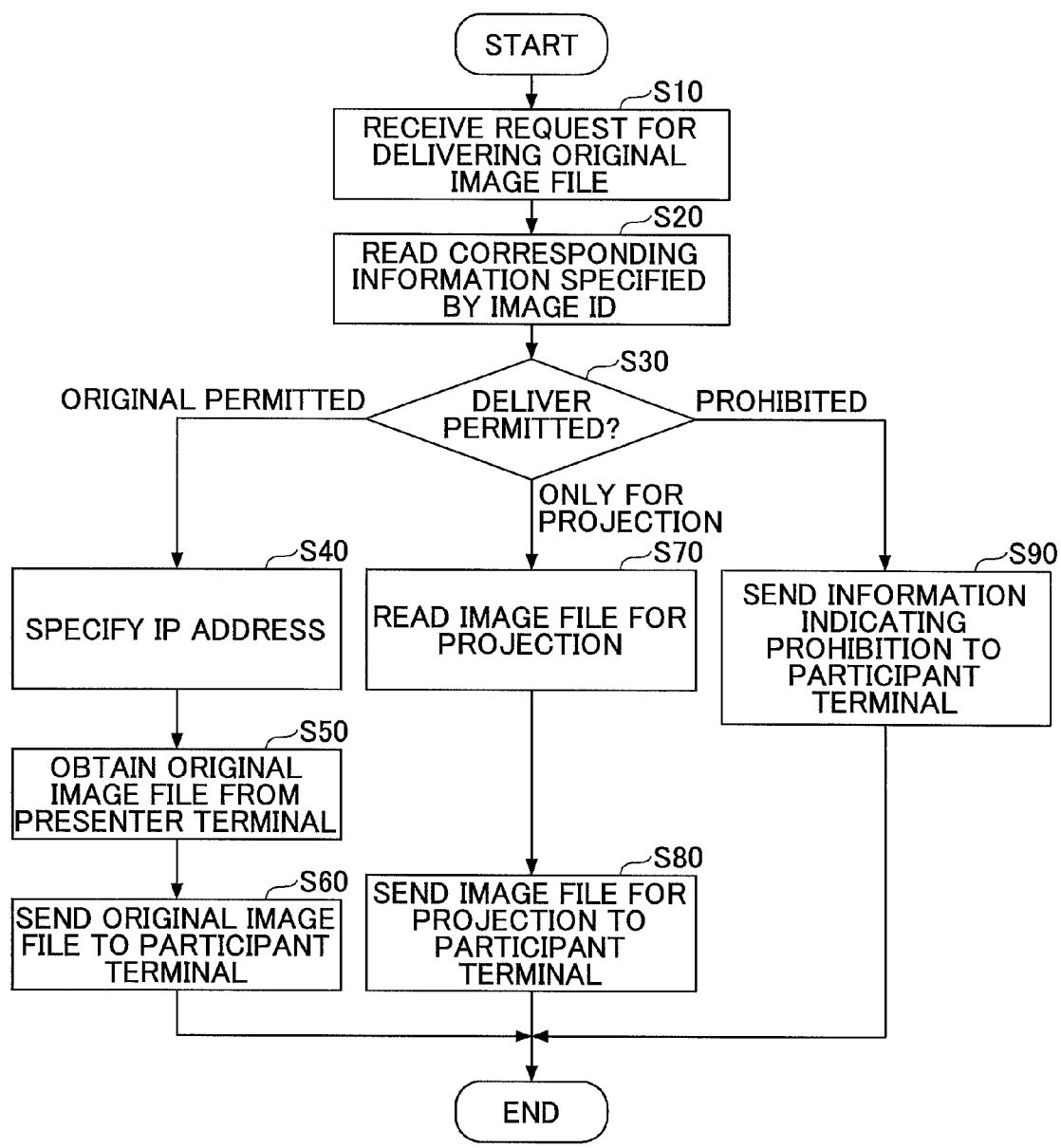
FIG. 13 is a flowchart showing an example of an operation of the projector.

FIG. 13 is a flowchart showing an example of an operation of the projector 100. The following operation corresponds to steps S4.13 to s4.26 in FIG. 9.

First, the operation accepting unit 31 of the projector 100 receives a request for delivering the original image file 200 (S10).

The projection image storing unit 35 reads the corresponding information 204 specified by the image ID (S20).

The projection image storing unit 35 refers to the delivering permit flag in the corresponding information 204, and determines whether the delivering of the original image file 200 or the image file for projection 202 is permitted (S30).

When the original image file 200 is permitted to be delivered (original permitted), the projection image storing unit 35 specifies the IP address of the presenter terminal 90 based on the corresponding information 204 (S40).

Then, the original image obtaining unit 36 obtains the original image file 200 from the presenter terminal 90 (S50). The original image sending unit 37 sends the original image file 200 to the participant terminal 80 (S60).

When the original image file 200 is not permitted to be delivered but the image file for projection 202 is permitted to be delivered (only for projection), the projection image storing unit 35 reads the image file for projection 202 (S70). When the image file for projection 202 is to be delivered, it is unnecessary to obtain the image file for projection 202 from the presenter terminal 90.

The original image sending unit 37 sends the image file for projection 202 to the participant terminal 80 (S80).

When it is prohibited to deliver both the original image file 200 and the delivering of the image file for projection 202, the original image sending unit 37 sends information indicating prohibition to the participant terminal 80 (S90).

As described above, the participant 220 can obtain the original image file 200. Further, even when the participant 220 cannot obtain the original image file 200, there may be a case when the participant 220 can obtain the image file for projection 202.

Figure 14:
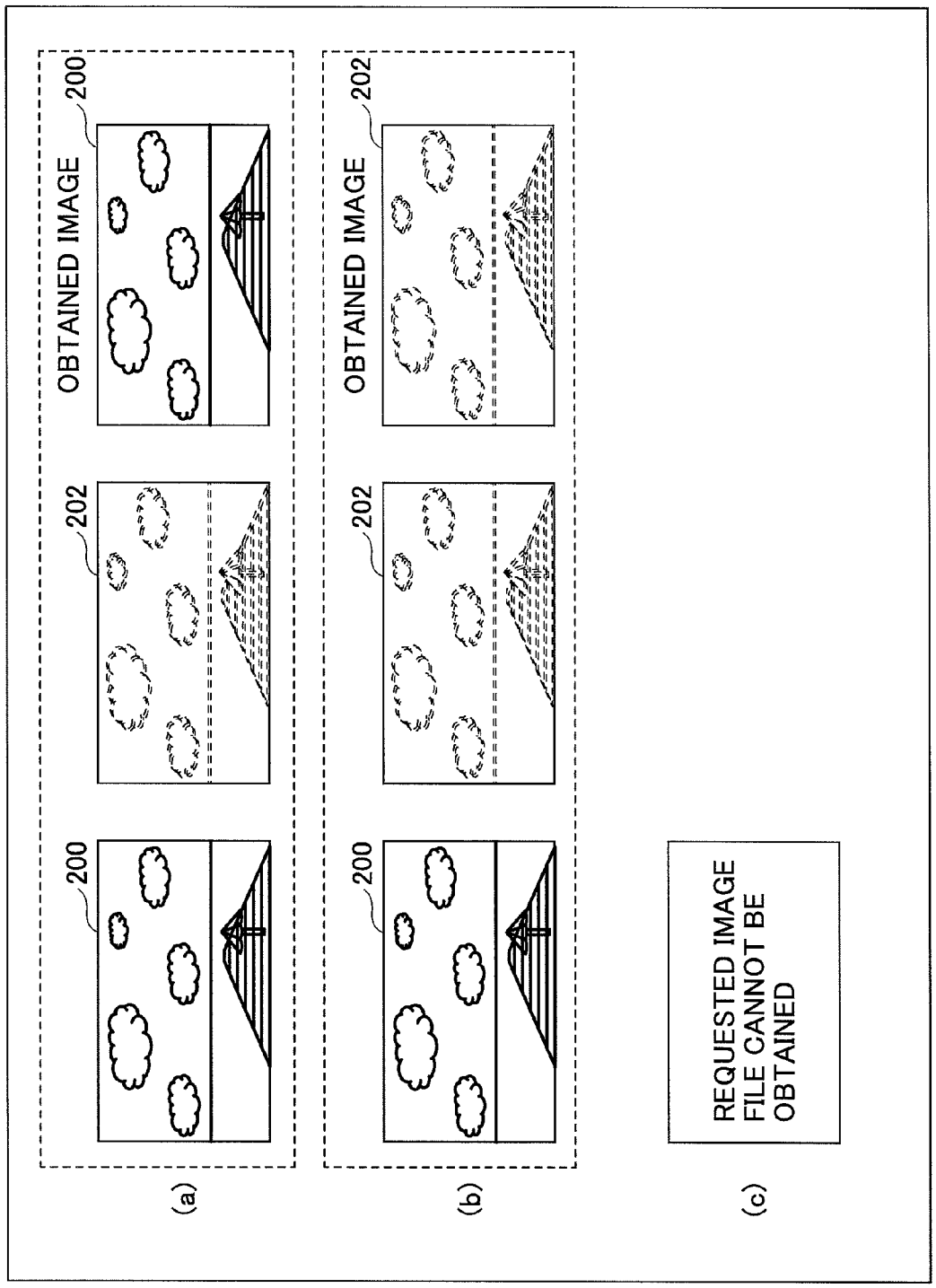
FIG. 14 is a view showing an example of images for each of the cases shown in FIG. 13.

FIG. 14 is a view showing an example of images for each of the cases shown in FIG. 13.

For a case (a), the participant obtains the original image file 200 in step S60. For a case (b), the participant obtains the image file for projection 202 in step S70. For a case (c), the participant cannot obtain either the original image file 200 or the image file for projection 202 and a message indicating "requested image file cannot be obtained" is shown in step S90.

The image quality of the image file for projection 202 may be degraded or the size of the image file for projection 202 may be smaller than that of the original image file 200 because of the conversion for projection. As shown for the case (a), when the original image file 200 is obtained, the image quality is higher.

Further, as shown for the case (b), even when the original image file 200 cannot be obtained, if the image file for projection 202 is obtained, the content of the image can be understood. At this time, the projector 100 may report a fact that the sent image file is the image file for projection 202 to the participant 220.

Further, as shown for the case (c), by the message indicating "requested image file cannot be obtained", the participant 220 can recognize that the image file cannot be obtained.

As described above, according to the image projection system 300 of the embodiment, the original image file 200 can be delivered to the participant 220. Thus, the participant 220 can obtain document data with a high quality to print or the like. Further, the image file obtained by the participant terminal 80 may be flexibly controlled.

(Second Embodiment)

In the image projection system 300 of this embodiment, whether to deliver the original image file 200 is controlled based on the history information.

As explained in the first embodiment, the projector 100 generates the history information in which the display start time and the display end time are recorded. Here, the image file for projection 202 for which the projected (or displayed) period is longer may be an important image file for the participant 220 or the presenter 210. Further, for the image file which is not so important it may be enough for the participant 220 to obtain the image file for projection 202 instead of the original image file 200.

Thus, the projector 100 of the embodiment determines whether to deliver the original image file 200 or the image file for projection 202 based on the history information. Specifically, the projector 100 delivers the original image file 200 for the image file for projection 202 for which display period is long and delivers the image file for projection 202 for the image file for projection 202 for which display period is not long, to the participant terminal 80 based on the display start time and the display end time of the history information.

Figure 15:
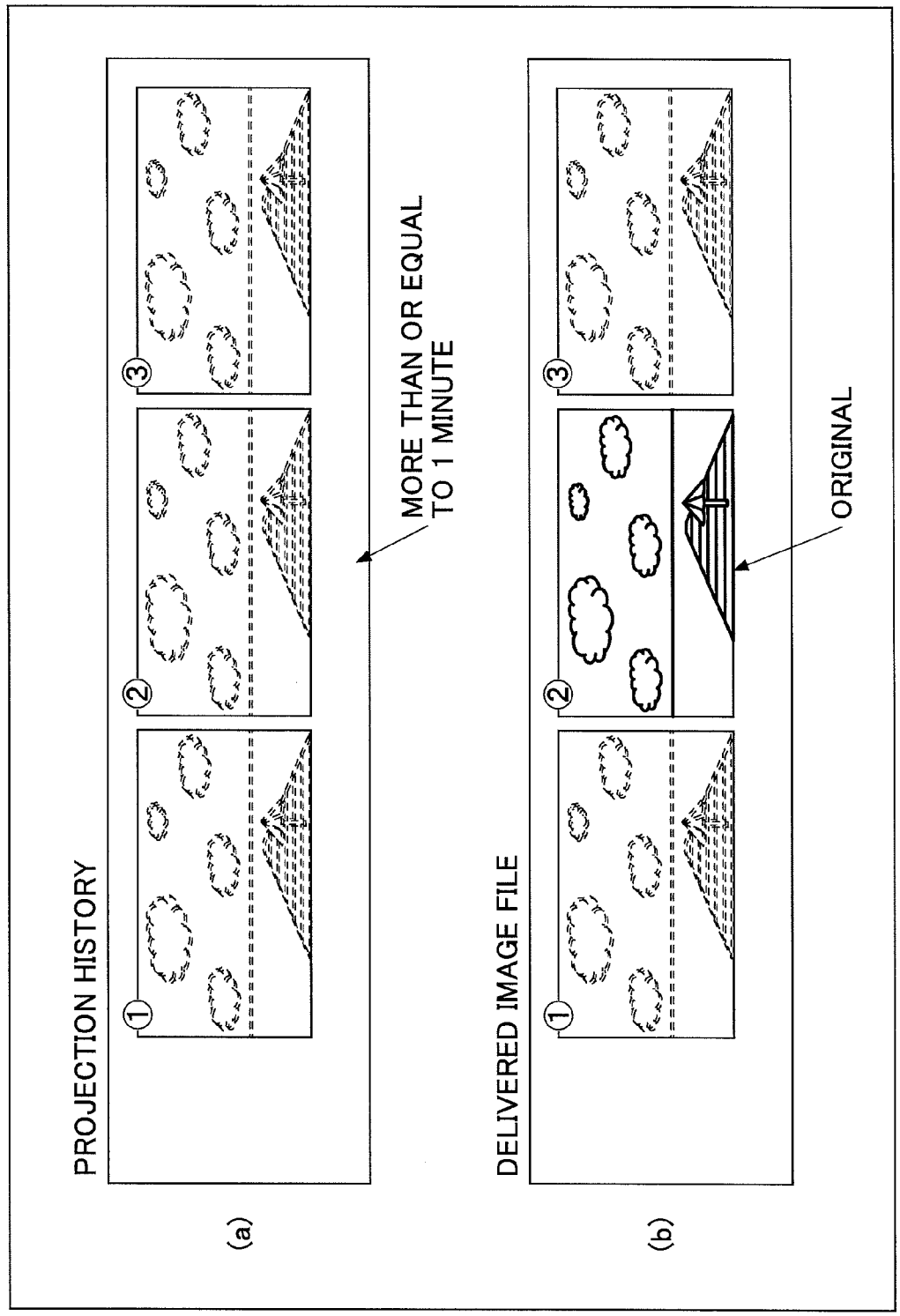
FIG. 15 is a view showing an example of images projected and delivered.

FIG. 15 is a view showing an example of images projected and delivered.

For (a), a projection history is schematically shown where the display period of the second image file for projection 202 (shown in the middle) is more than or equal to 1 minute, for example.

For (b), image files delivered to the participant terminal 80 are schematically shown. It is assumed that the participant requested to obtain three image files, as shown in (a), for example. In such a case, the projector 100 refers the history information and determines that for the first image file, the image file for projection is to be delivered as the display period is short. The projector 100 determines that for the second image file, the original image file is to be delivered as the display period is long. Further, the projector 100 determines that for the third image file, the image file for projection is to be delivered as the display period is short. By the above determination, the participant terminal 80 obtains the original image file only for the second image file.

Thus, the image projection system 300 of the embodiment can selectively send an image file with a high quality when the important image file is selected. Further, for the image file not so important, the image file for projection is delivered to reduce a load on the network 101.

Figure 16:
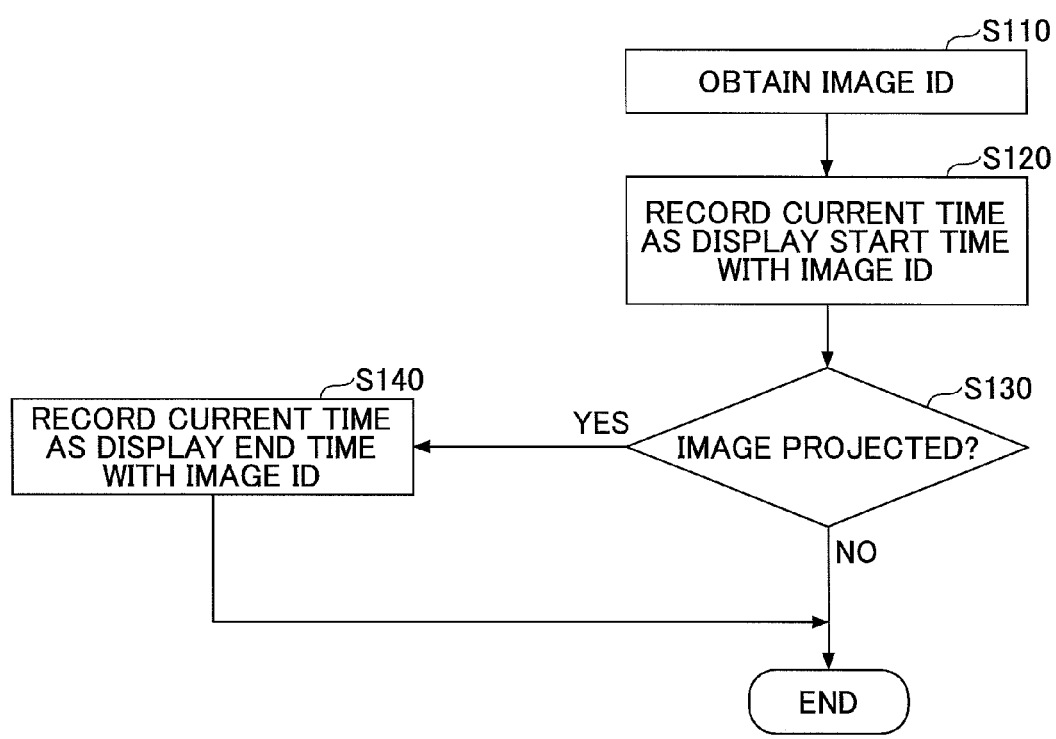
FIG. 16 is a flowchart showing an example of an operation of generating the history information.

FIG. 16 is a flowchart showing an example of an operation of generating the history information. The following operation corresponds to step s1.9 in FIG. 9. Thus, the projection image storing unit 35 has already generated the image file for projection 202, and the history generating unit 33 has already obtained the image ID of the image file for projection 202 (S110).

The history generating unit 33 records the current time as the display start time in correspondence with the image ID of the image file for projection 202 (S120). With this operation, the history information becomes as follows, for example.
Image ID: 2.jpg
Display start time: 23:00

Then, the history generating unit 33 determines whether the image projection unit 32 is projecting an image (S130). The projection image storing unit 35 manages whether there is an image being projected.

When no image is being projected (NO in S130), the operation of the history generating unit 33 ends.

When an image is being projected (YES in S130), the history generating unit 33 records the current time as the display end time in correspondence with the image ID of the currently projected image file for projection (S140). With this operation, the display period can be determined. With this operation, the history information becomes as follows, for example.
Image ID: 1.jpg
Display end time: 23:00

Figure 17:
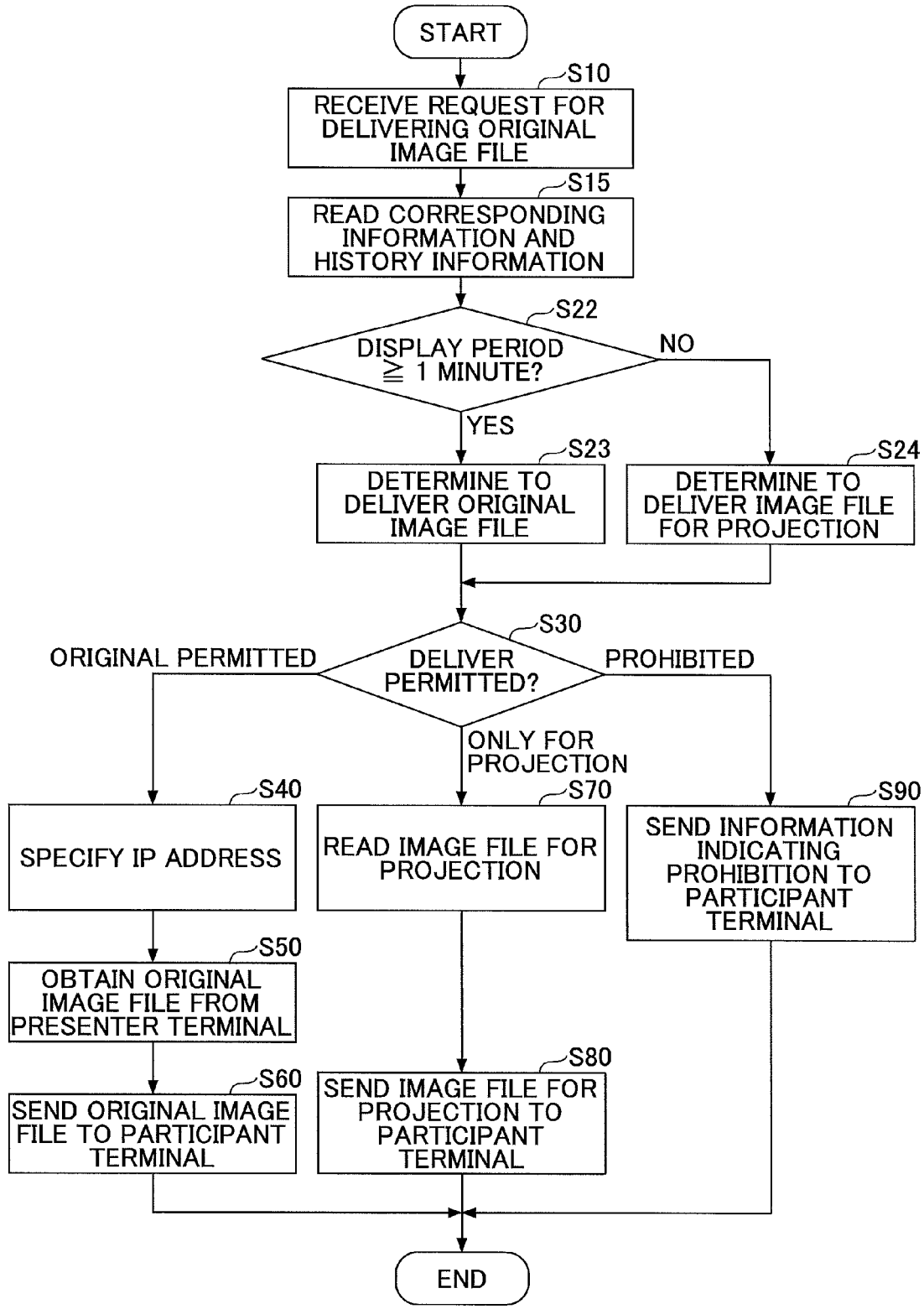
FIG. 17 is a flowchart showing an example of an operation of the projector.

FIG. 17 is a flowchart showing an example of an operation of the projector 100. The following operation corresponds to steps S4.13 to s4.26 in FIG. 9. The following operation is basically the same as that shown in FIG. 13, and only the operation in step S22 is different.

First, the operation accepting unit 31 of the projector 100 receives a request for delivering the original image file 200 (S10).

The projection image storing unit 35 reads the corresponding information 204 and the history information specified by the image ID (S15).

Then, the projection image storing unit 35 calculates the display period based on the display start time and the display end time of the history information, and determined whether the display period is more than or equal to a predetermined period (S22). Here, the predetermined period may be 1 minute, for example. Here, when the display end time of the image file for projection 202 is not recorded because the image file is being projected by the image projection unit 32, the projection image storing unit 35 assumes the current time as the display end time and calculates the display period up to the current time.

When the display period is more than or equal to the predetermined period (YES in S22), the projection image storing unit 35 determines to deliver the original image file 200 as a candidate for delivery (S23).

When the display period is less than the predetermined period (NO in S22), the projection image storing unit 35 determines the image file for projection 202 as a candidate for delivery (S24).

Even when it is determined that the image file is the important one, as the delivering permit flag set by the presenter 210 is effective, the operation same as that shown in FIG. 13 is performed after steps S23 and S24.

The projection image storing unit 35 refers to the delivering permit flag in the corresponding information 204, and determines whether the delivering of the original image file 200 or the image file for projection 202 is permitted (S30).

When the original image file 200 is the candidate for delivery and when the original image file 200 is permitted to be delivered, the projection image storing unit 35 specifies the IP address of the presenter terminal 90 based on the corresponding information 204 (S40).

Then, the original image obtaining unit 36 obtains the original image file 200 from the presenter terminal 90 (S50). The original image sending unit 37 sends the original image file 200 to the participant terminal 80 (S60).

When the original image file 200 is the candidate for delivery and only the delivering of the image file for projection 202 is permitted (when the delivering of the original image file 200 is not permitted), or when the image file for projection 202 is the candidate for delivery and the delivering of the image file for projection 202 is permitted, the projection image storing unit 35 reads the image file for projection 202 (S70). The original image sending unit 37 sends the image file for projection 202 to the participant terminal 80 (S80).

Regardless of the kind of the image file of the candidate for delivery, when both the delivering of the original image file 200 and the delivering of the image file for projection 202 are prohibited, the original image sending unit 37 sends information indicating prohibition to the participant terminal 80 (S90).

As described above, according to the image projection system of the embodiment, the original image file 200 is selectively delivered for the request for delivering the image file for projection 202 which is determined to be important while responding to the setting of permission of delivery.
(Third Embodiment)

In the second embodiment, whether to deliver the original image file 200 is determined based on whether the requested image file for projection 202 is important. However, there may be a case when the participant wants to confirm a content of the image file for projection 202 which is difficult to see by using the participant terminal 80 even when the image file is not so important.

Thus, the projector 100 of the embodiment determines whether to deliver the original image file 200 or the image file for projection 202 based on the operation history of the history information. Specifically, the projector 100 delivers the original image file 200 for the image file for projection 202 for which it is determined to be difficult to be seen based on the operation history to the participant terminal 80. The projector 100 delivers the image file for projection 202 for the image file for projection 202 for which it is determined not to be difficult to be seen based on the operation history to the participant terminal 80. Here, the image file for projection 202 for which the "magnifying operation" is recorded in the operation history is determined to be difficult to be seen, for example.

Figure 18:
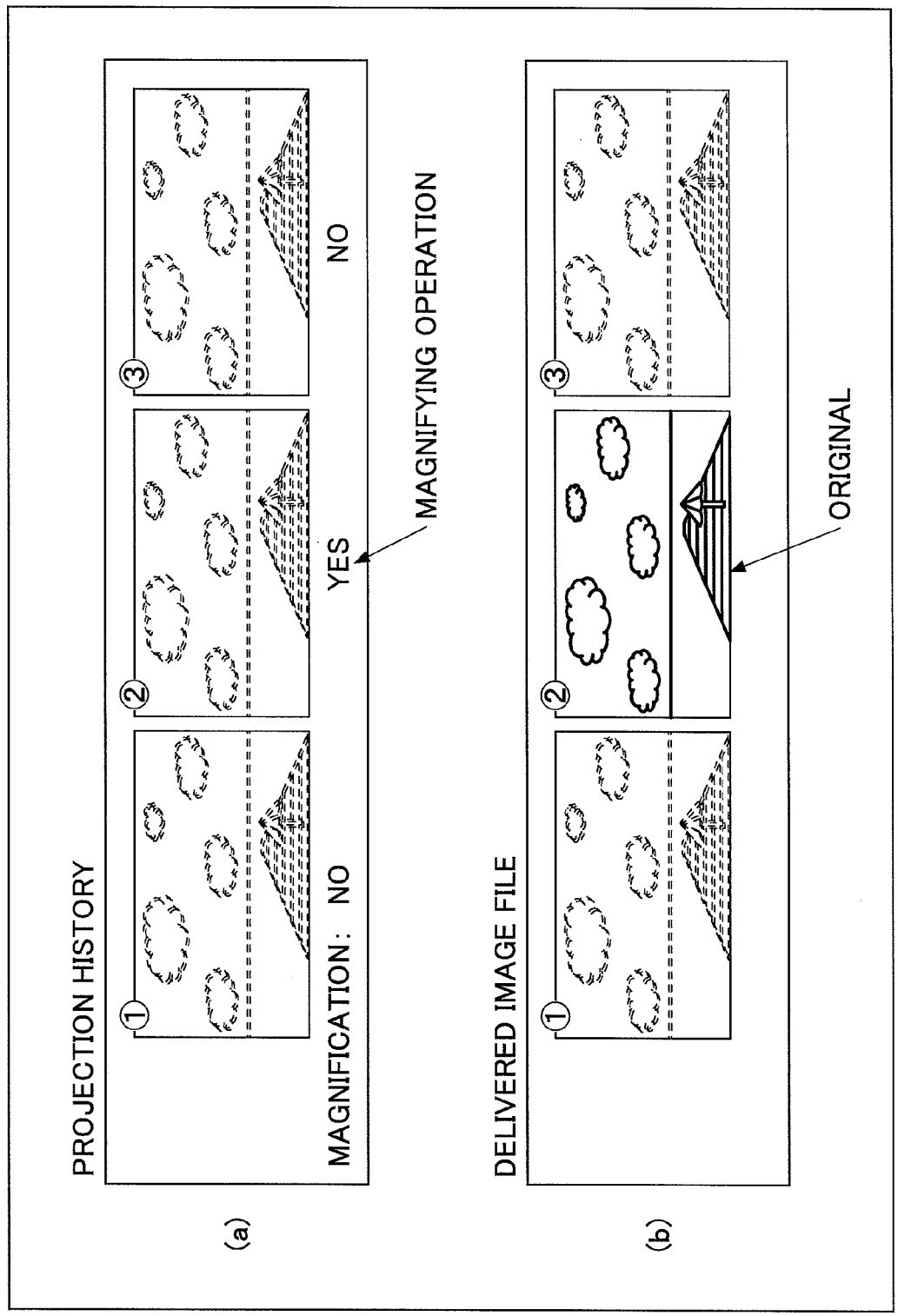
FIG. 18 is a view showing an example of images projected and delivered.

FIG. 18 is a view showing an example of images projected and delivered.

For (a), history information is schematically shown where magnifying operation history is recorded for the second image file for projection 202 (shown in the middle).

For (b), image files delivered to the participant terminal 80 are schematically shown. It is assumed that the participant requested to obtain three image files, as shown in (a), for example. In such a case, the projector 100 refers to the history information and determines that for the first image file, the image file for projection is to be delivered as the magnifying operation history is not recorded for this image file. The projector 100 determines that for the second image file, the original image file is to be delivered as the magnifying operation history is recorded for the image file. Further, the projector 100 determines that for the third image file, the image file for projection is to be delivered as the magnifying operation history is not recorded for the image file. By the above determination, the participant terminal 80 obtains the original image file only for the second image file.

Thus, the image projection system 300 of the embodiment can deliver the image file with a high quality only for the image file that is difficult to see for the participant. Further, as the image file for projection 202 is delivered for the image file which is not difficult to see, a load to the network 101 can be reduced.

Figure 19:
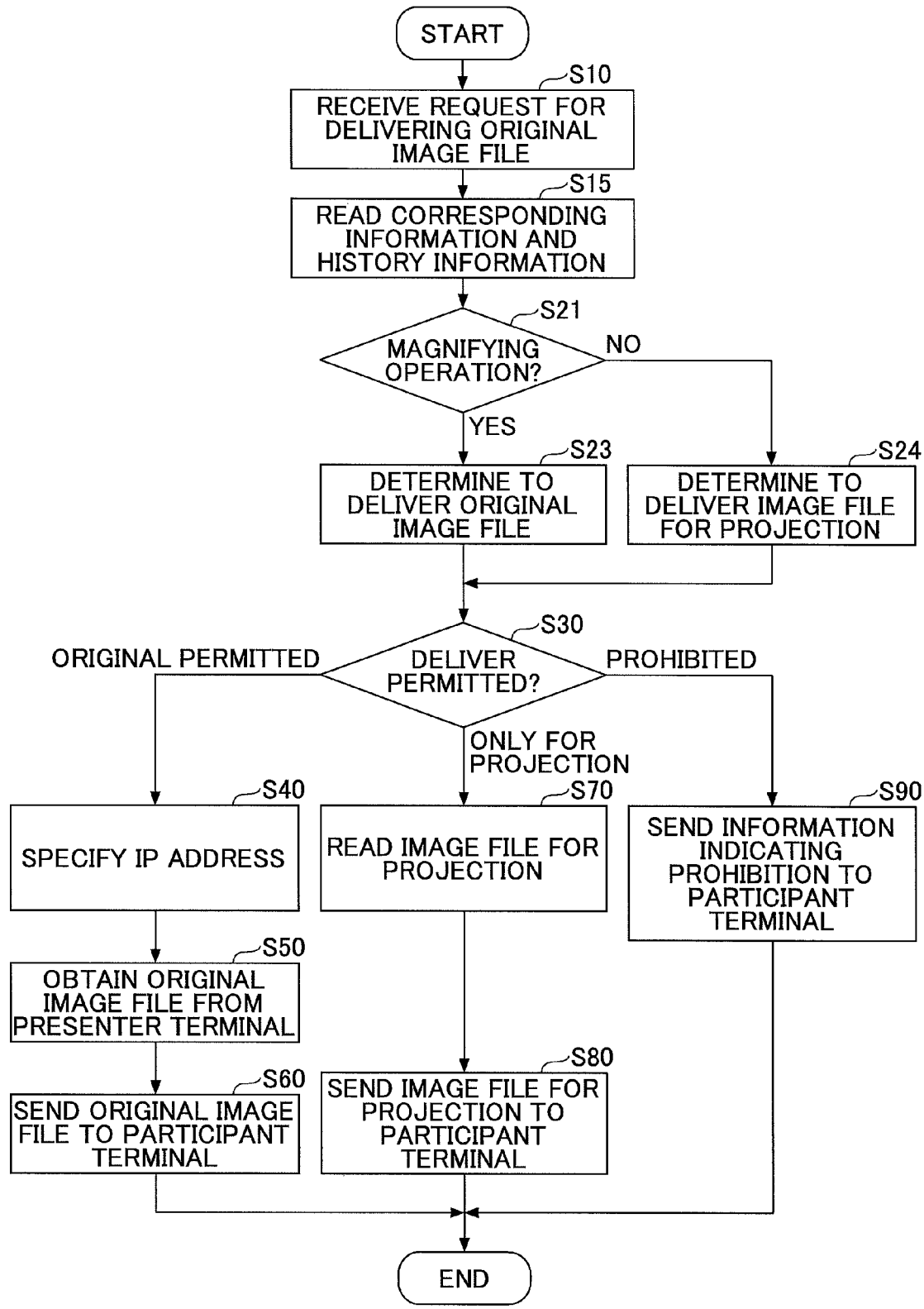
FIG. 19 is a flowchart showing an example of an operation of the projector.

FIG. 19 is a flowchart showing an example of an operation of the projector 100. FIG. 19 corresponds to steps S4.13 to s4.26 of FIG. 9. The operation is basically the same as that shown in FIG. 17, and only the operation in step S21 is different from that in step S22 shown in FIG. 17.

First, the operation accepting unit 31 of the projector 100 receives a request for delivering the original image file 200 (S10).

The projection image storing unit 35 reads the corresponding information 204 and the history information specified by the image ID (S15).

Next, the projection image storing unit 35 determines whether a magnifying operation history is included in the history information (S21).

When the magnifying operation history is included (YES in S21), the projection image storing unit 35 determines the original image file 200 as a candidate for delivery (S23).

When the magnifying operation history is not included (NO in S21), the projection image storing unit 35 determines the image file for projection 202 as a candidate for delivery (S24).

Even when the image file is difficult to be seen, as the delivering permit flag set by the presenter 210 is effective, the operation same as that shown in FIG. 13 is performed after steps S23 and S24.

The projection image storing unit 35 refers the delivering permit flag in the corresponding information 204, and determined whether the delivering of the original image file 200 or the delivering of the image file for projection 202 is permitted (S30).

When the original image file 200 is the candidate for delivery and when the original image file 200 is permitted to be delivered, the projection image storing unit 35 specifies the IP address of the presenter terminal 90 based on the corresponding information 204 (S40).

Then, the original image obtaining unit 36 obtains the original image file 200 from the presenter terminal 90 (S50). The original image sending unit 37 sends the original image file 200 to the participant terminal 80 (S60).

When the original image file 200 is the candidate for delivery and when only the image file for projection 202 is permitted to be delivered (the original image file 200 is not permitted to be delivered), or when the image file for projection 202 is the candidate for delivery and when the image file for projection 202 is permitted to be delivered, the projection image storing unit 35 reads the image file for projection 202 (S70). The original image sending unit 37 sends the image file for projection 202 to the participant terminal 80 (S80).

Regardless of the kind of the image file of the candidate for delivery, when both the delivering of the original image file 200 and the delivering of the image file for projection 202 are prohibited, the original image sending unit 37 sends information indicating prohibition to the participant terminal 80 (S90).

As described above, according to the image projection system of the embodiment, the original image file 200 is selectively delivered for the request for delivering the image file for projection 202 which is determined to be difficult to be seen while responding to the setting of permission of delivery.

(Fourth Embodiment)

In the second embodiment and in the third embodiment, whether to deliver the original image file 200 is determined based on whether the requested image file for projection 202 is important and difficult to be seen, respectively. However, there may be a case when it is unnecessary to deliver the image file when it is not important or it is not difficult to be seen.

Thus, the projector 100 of the embodiment does not deliver the image file when the image file is not important or not difficult to be seen.

Figure 20:
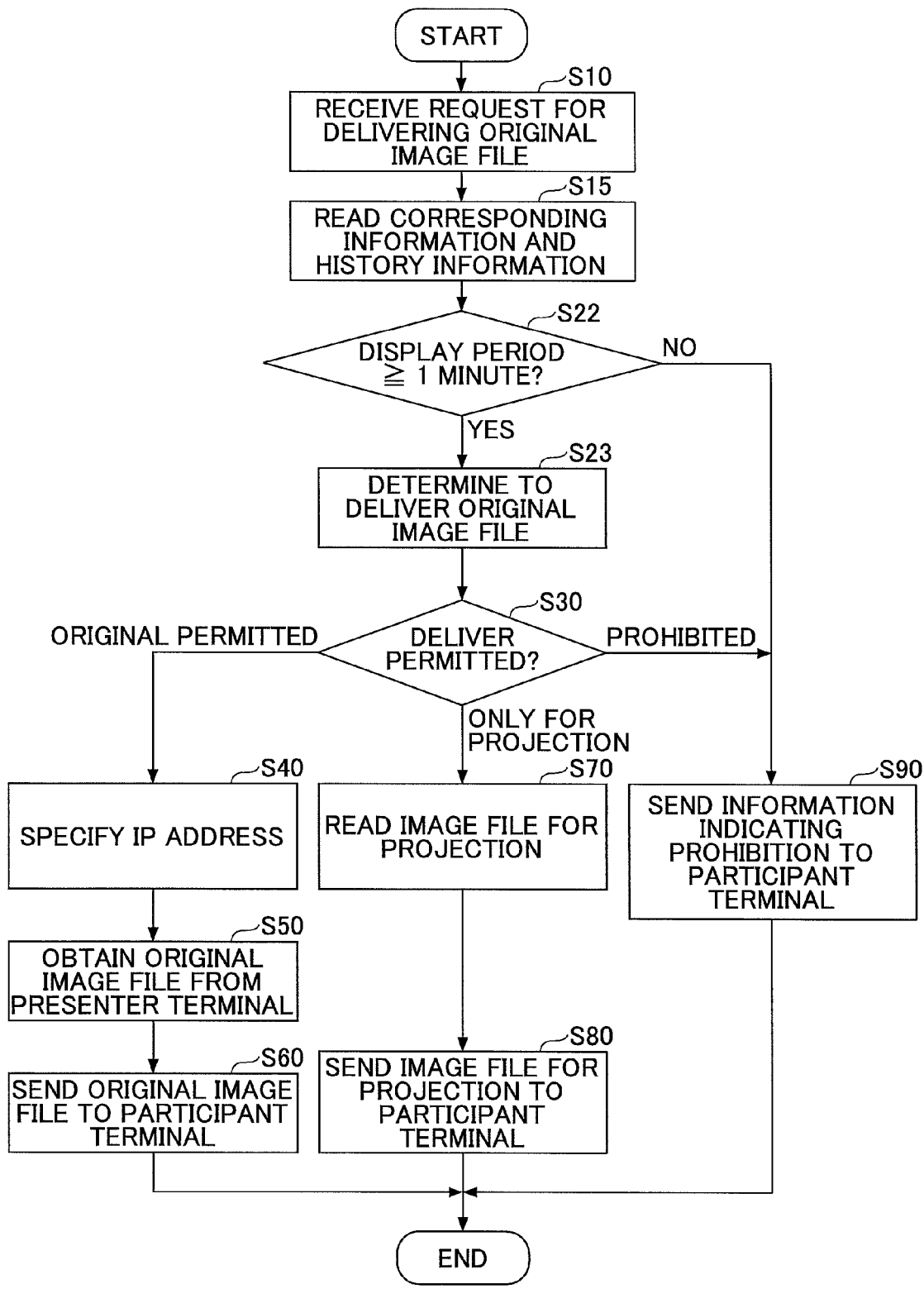
FIG. 20 is a flowchart showing an example of an operation of the projector.

FIG. 20 is a flowchart showing an example of an operation of the projector 100. FIG. 20 corresponds to steps S4.13 to s4.26 of FIG. 9. The operation is basically the same as that shown in FIG. 17, and only the operation when it is determined to be "NO" in step S22 is different from that in step S22 shown in FIG. 17.

First, the operation accepting unit 31 of the projector 100 receives a request for delivering the original image file 200 (S10).

The projection image storing unit 35 reads the corresponding information 204 and the history information specified by the image ID (S15).

Then, the projection image storing unit 35 calculates the display period based on the display start time and the display end time of the history information, and determines whether the display period is more than or equal to a predetermined period (S22). The predetermined period may be 1 minute, for example.

When the display period is more than or equal to the predetermined period (YES in S22), the projection image storing unit 35 determines the original image file 200 as a candidate for delivery (S23).

When the display period is less than the predetermined periods (NO in S22), the projection image storing unit 35 determines not to deliver any image file (S90). With this operation, the delivering of unimportant image files can be suppressed.

The following operation is the same as that explained in the second embodiment and in the third embodiment. The projection image storing unit 35 refers to the delivering permit flag in the corresponding information 204, and determines whether the delivering of the original image file 200 or the image file for projection 202 is permitted (S30).

When the original image file 200 is the candidate for delivery and when the original image file 200 is permitted to be delivered, the projection image storing unit 35 specifies the IP address of the presenter terminal 90 based on the corresponding information 204 (S40).

Then, the original image obtaining unit 36 obtains the original image file 200 from the presenter terminal 90 (S50). The original image sending unit 37 sends the original image file 200 to the participant terminal 80 (S60).

When the original image file 200 is the candidate for delivery and when only the image file for projection 202 is permitted to be delivered (the original image file 200 is not permitted to be delivered), or when the image file for projection 202 is the candidate for delivery and when the image file for projection 202 is permitted to be delivered, the projection image storing unit 35 reads the image file for projection 202 (S70). The original image sending unit 37 sends the image file for projection 202 to the participant terminal 80 (S80).

Regardless of the kind of the image file of the candidate for delivery, when both the delivering of the original image file 200 and the delivering of the image file for projection 202 are prohibited, the original image sending unit 37 sends information indicating prohibition to the participant terminal 80 (S90).

When the operation of the embodiment is applied to that of the third embodiment, the difference is that only the operation in step S22 becomes the operation in S21. Thus, the explanation is not repeated.

(When Inquiring Participant)

In this embodiment, although it is described that the image file not important or not difficult to be seen is not delivered, whether to deliver the image file not important or not difficult to be seen may be determined by the participant 220. There may be a participant who wants to obtain all of the image files even when the image file is not important. Further, which of the image files is important may depend on the participant.

Thus, in this example, when the participant requests the original image file 200, the participant sets whether it is necessary to obtain the image file not important or not difficult to be seen.

Figure 21:
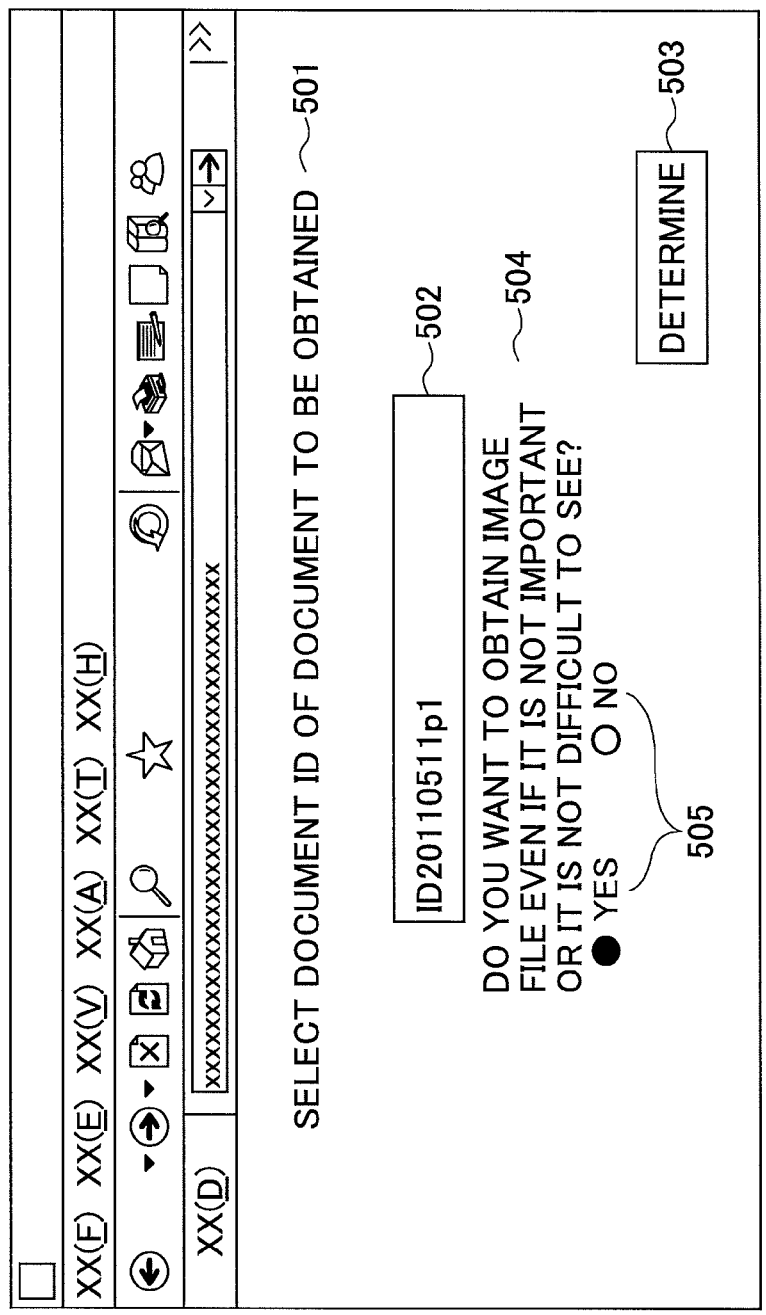
FIG. 21 is a view showing an example of an image information input display displayed on a display device 27 of the participant terminal.

FIG. 21 is a view showing an example of an image information input display displayed on the display device 27 of the participant terminal 80. In FIG. 21, the same components are given the same reference numerals as those shown in FIG. 12A, and explanations are not repeated. In FIG. 21, a message 504 indicating "Do you want to obtain image file even if it is not important or it is not difficult to see?", and radio buttons 505 for selecting "YES" or "NO" are displayed. When the participant wants to obtain the image file requested even when it is not important or it is not difficult to see, the participant selects "YES"; if not, the participant selects "NO". The selected result may be referred to as "delivering necessity information" in the following. The delivering necessity information is sent to the projector 100 from the participant terminal 80 with the image ID of the image file for projection 202.

Figure 22:
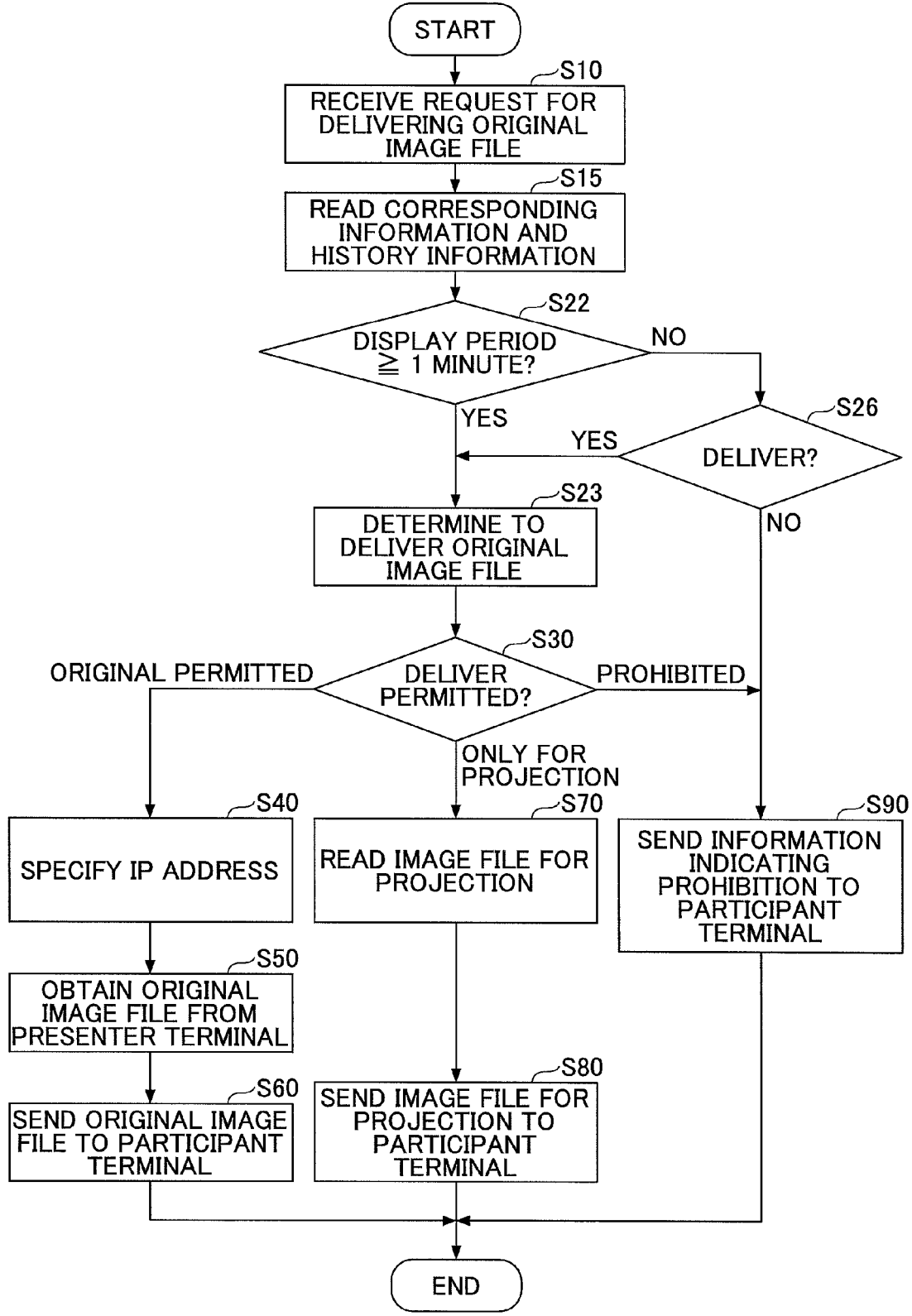
FIG. 22 is a flowchart showing an example of an operation of the projector.

FIG. 22 is a flowchart showing an example of an operation of the projector 100. FIG. 22 corresponds to steps S4.13 to s4.26 of FIG. 9. The operation is basically the same as that shown in FIG. 20, and only the operation when it is determined to be "NO" in step S22 is different from that in step S22 shown in FIG. 20.

First, the operation accepting unit 31 of the projector 100 receives a request for delivering the original image file 200 (S10).

The projection image storing unit 35 reads the corresponding information 204 and the history information specified by the image ID (S15).

Then, the projection image storing unit 35 calculates the display period based on the display start time and the display end time of the history information, and determines whether the display period is more than or equal to a predetermined period (S22). The predetermined period may be 1 minute, for example.

When the display period is more than or equal to the predetermined period (YES in S22), the projection image storing unit 35 determines the original image file 200 as a candidate for delivery (S23).

When the display period is less than the predetermined period (NO in S22), the projection image storing unit 35 refers the delivering necessity information and determines whether delivering the image file is necessary (S26).

When it is determined that the delivering is necessary (YES in S26), the projection image storing unit 35 determines the original image file 200 as a candidate for delivery (S23). With this operation, even for the image file which is not important, the original image file 200 can be set as the candidate for delivery for the requested image file. The operation proceeds to step S30, and the same operation as explained with reference to FIG. 20 is performed.

When it is determined that the delivering is unnecessary (NO in S26), the operation proceeds to step S90 and the same operation as explained with reference to FIG. 20 is performed. With this operation, the delivering of unimportant image files can be suppressed.

When the operation of the embodiment is applied to that of the third embodiment, the difference is that only the operation in step S22 becomes the operation in S21. Thus, the explanation is not repeated.

According to the embodiment, for example, when the number of projected image files is large, the projector 100 can selectively deliver the important part of the presentation to the participant terminal 80. Thus, the participant can obtain the image file by which the content of the presentation can be easily understood. Further, when the number of projected image files is small, or when the original image file 200 is necessary, the participant can arbitrarily obtain the original image file 200.

(Fifth Embodiment)

In the third embodiment, whether to deliver the original image file 200 or the image file for projection 202 is determined based on the magnifying operation recorded in the history information. In this embodiment, when the magnifying operation is recorded in the history information, the image projection system delivers magnified image data to the participant terminal 80.

By delivering the magnified image data to the participant, an image file of a magnified important part can be generated from the original image file 200 and delivered to the participant terminal 80.

Figure 23:
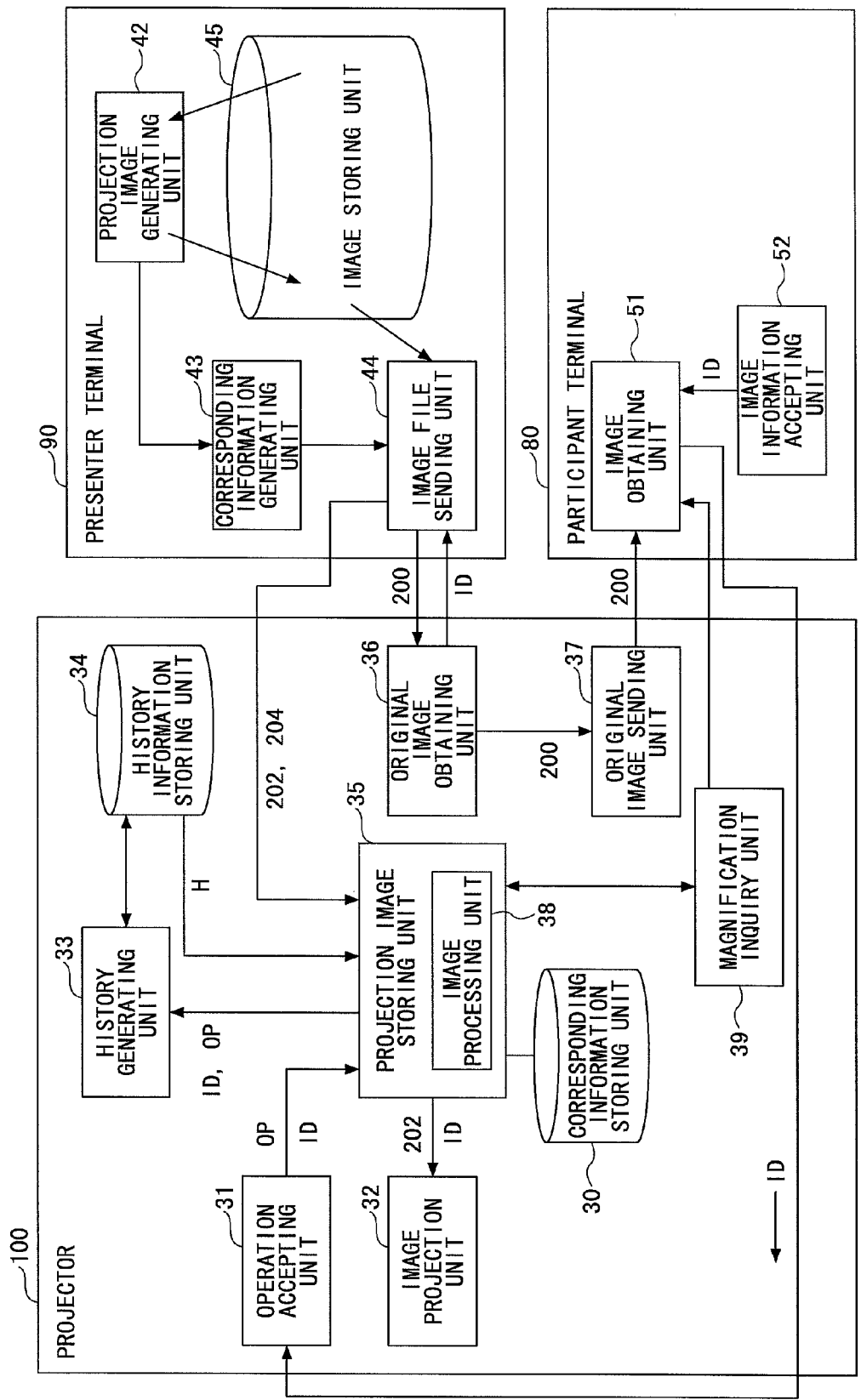
FIG. 23 is a block diagram showing an example of a functional structure of the image projection system of an embodiment.

FIG. 23 is a block diagram showing an example of a functional structure of the image projection system 300 of the embodiment. In FIG. 23, the same components are given the same reference numerals as those shown in FIG. 6, and explanations are not repeated. The projector 100 shown in FIG. 23 further includes a magnification inquiry unit 39.

The magnification inquiry unit 39 inquires of the participant whether to magnify the original image file 200 when the magnifying operation is recorded in the history information. Then, the magnification inquiry unit 39 receives the result of the inquiry from the participant terminal 80 and reports the result to the projection image storing unit 35.

Figure 24:
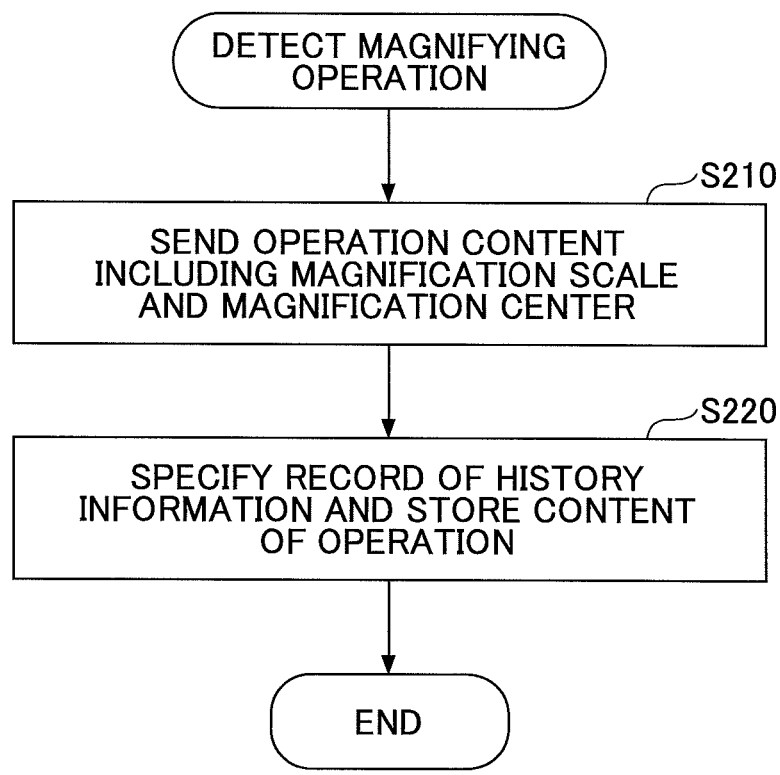
FIG. 24 is a flowchart showing an example of an operation of generating the history information by a history generating unit 33 of an embodiment.

FIG. 24 is a flowchart showing an example of an operation of generating the history information by the history generating unit 33 of the embodiment. As explained as steps S3.0 to S3.9 of the first embodiment with reference to FIG. 9, the history generating unit 33 stores a content of operation in the history information storing unit 34. The history generating unit 33 of the embodiment further stores magnification scale of the magnifying operation in the history information storing unit 34 in addition to the content of operation.

First, the operator 230 (the participant 220, the presenter 210 or the like) operates the user I/F 17 of the projector 100 to magnify the image. The magnification scale may be determined by a period for which the operator 230 pushes a button to magnify, a magnification scale input by numerals or the like. Further, the operator 230 may specify the magnification center of the image. The magnification center may be assigned by coordinates such as (30, 40) or the like, for which the left and upper corner of the image is set as an origin. Alternatively, the magnification center may be assigned by selecting a cell formed by dividing the image file into 9 to 16 cells, for example. Further, when the projector 100 includes a camera, the magnification center may be set at a position in the projected image where the operator indicated by his or her finger or a laser pointer. The operation accepting unit 31 sends the content of operation including the magnification scale and the magnification center to the projection image storing unit 35 (S210). The projection image storing unit 35 reports the content of operation and the image ID of the currently projected image file for projection to the history generating unit 33.

The history generating unit 33 specifies the record of the history information based on the image ID, and stores the content of operation in the history information storing unit 34 (S220).

FIG. 25 is a view showing an example of the history information of the embodiment. In FIG. 25, the history information includes items such as "magnification scale" and "magnification center" corresponding to the content of operation. Here, it is recorded that the magnification scale is "×4" and the magnification center is "(30, 40)" for the content of operation "magnify" for the image ID of the image file for projection 202 "1.jpg".

Then, the projection image storing unit (image processing unit 38) performs a magnifying process on the image file for projection 202. This operation is similar to that shown in the first embodiment.

Figure 26:
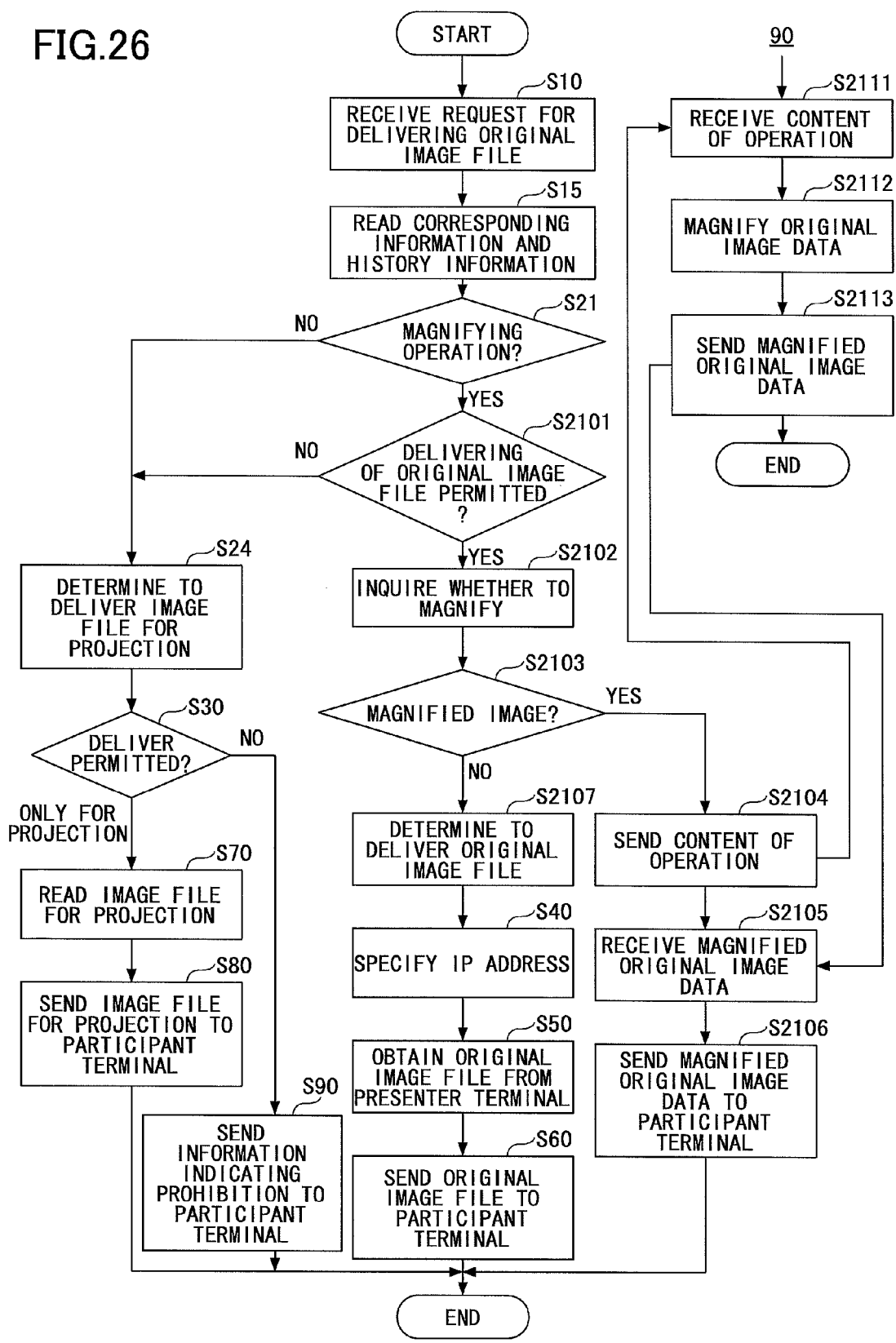
FIG. 26 is a flowchart showing an example of an operation of the projector.

FIG. 26 is a flowchart showing an example of an operation of the projector 100.

First, the operation accepting unit 31 of the projector 100 receives a request for delivering the original image file 200 (S10).

The projection image storing unit 35 reads the corresponding information 204 and the history information specified by the image ID (S15).

Next, the projection image storing unit 35 determines whether a magnifying operation history is included in the history information (S21).

When the magnifying operation history is included (YES in S21), the projection image storing unit 35 refers to the delivering permit flag in the corresponding information 204, and determines whether the delivering of the original image file 200 is permitted (S2101). When the delivering of the original image file 200 is not permitted, the delivering of the magnified original image file 200 should not be permitted as well.

When the original image file 200 is permitted to be delivered (YES in S2101), the magnification inquiry unit 39 inquires of the participant whether to magnify the original image file 200 (S2102). The magnification inquiry unit 39 generates an HTML file, for example, and sends it to the image information accepting unit 52 of the participant terminal 80.

Figure 27:
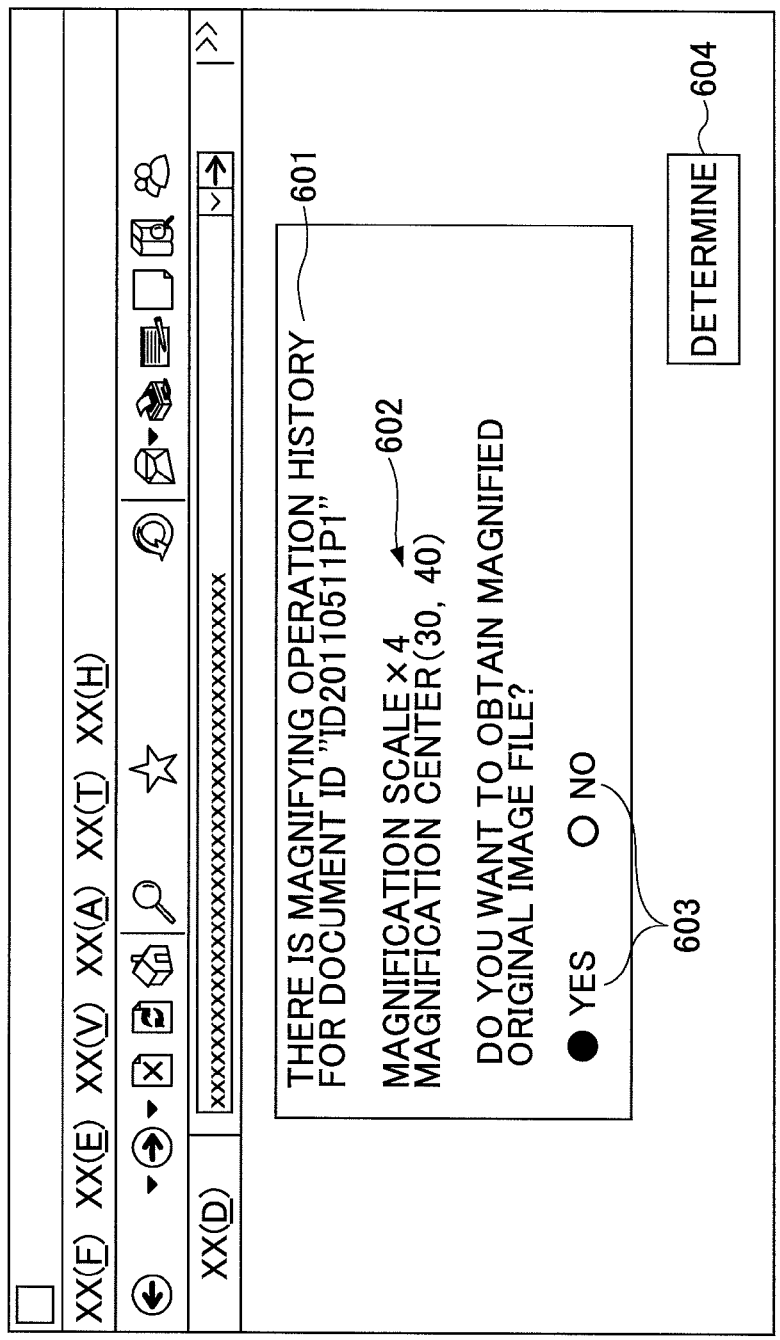
FIG. 27 is a view showing an example of a magnification inquiry display image displayed on a display device of the participant terminal.

FIG. 27 is a view showing an example of a magnification inquiry display image displayed on the display device 27 of the participant terminal 80. In FIG. 27, a message 601 indicating "there is magnifying operation history for document ID ID20110511p1", the magnification scale and magnification center 602, and radio buttons 603 for selecting "YES" or "NO" are displayed. The participant confirms the document ID, the magnification scale and the magnification center, and determines whether to request the delivering of the magnified original image file 200. The participant sets whether to request the delivering of the magnified original image file 200 by the radio buttons 603, and pushes a determination button 604. With this operation, whether to request the delivering of the magnified original image file 200 is sent.

Referring back to FIG. 26, the magnification inquiry unit 39 determines whether to send a request for the magnified image to the presenter terminal 90 based on the result of the inquiry (S2103).

When the participant does not request the magnified image (NO in S2103), the projection image storing unit 35 determines to deliver the original image file 200 (S2107). The reason to determine, not just setting as the candidate for delivery, is that the delivering permit flag is already checked in this example.

When the participant requests the magnified image (YES in S2103), the original image obtaining unit 36 sends the image ID and the content of operation to the presenter terminal 90 in order to obtain the magnified original image file 200 (S2104). With this operation, the presenter terminal 90 can obtain the magnification scale and the magnification center.

The projection image generating unit 42 of the presenter terminal 90 obtains the content of operation (S2111).

The projection image generating unit 42 reads the original image file 200 specified by the image ID from the image storing unit 45, and performs the magnifying process (S2112).

The image file sending unit 44 sends the magnified original image file 200 to the projector 100 (S2113).

The original image obtaining unit 36 of the projector 100 receives the magnified original image file 200 (S2105). Subsequently, the original image sending unit 37 sends the magnified original image file 200 to the participant terminal 80 (S2106). With the above operation, the participant terminal 80 can obtain the magnified important part of the original image file 200.

In step S21, when the magnifying operation history is not included (NO in S21), the projection image storing unit 35 determines the image file for projection 202 as a candidate for delivery (S24), and the same operation as that of the third embodiment is performed.

Thus, the projection image storing unit 35 refers to the delivering permit flag in the corresponding information 204, and determines whether the delivering of the image file for projection 202 is permitted (S30).

When the image file for projection 202 is the candidate for delivery and the delivering of the image file for projection 202 is permitted, the projection image storing unit 35 reads the image file for projection 202 (S70). The original image sending unit 37 sends the image file for projection 202 to the participant terminal 80 (S80).

When the delivering of the image file for projection 202 is prohibited, the original image sending unit 37 sends information indicating prohibition to the participant terminal 80 (S90).

In step S21, when the magnifying operation history is not included (NO in S21), the projection image storing unit 35 may determine not to deliver any of the original image file 200 and the image file for projection 202 as described in the fourth embodiment.

According to the embodiment, as the important part is magnified from the original image file 200 whose resolution is high, the image file of the important part with a small data amount can be generated.

(Sixth Embodiment)

In the above embodiments, the participant terminal 80 obtains the original image file 200 from the projector 100. However, according the image projection system of the embodiment, the participant terminal 80 obtains the original image file 200 from the presenter terminal 90.

Figure 28:
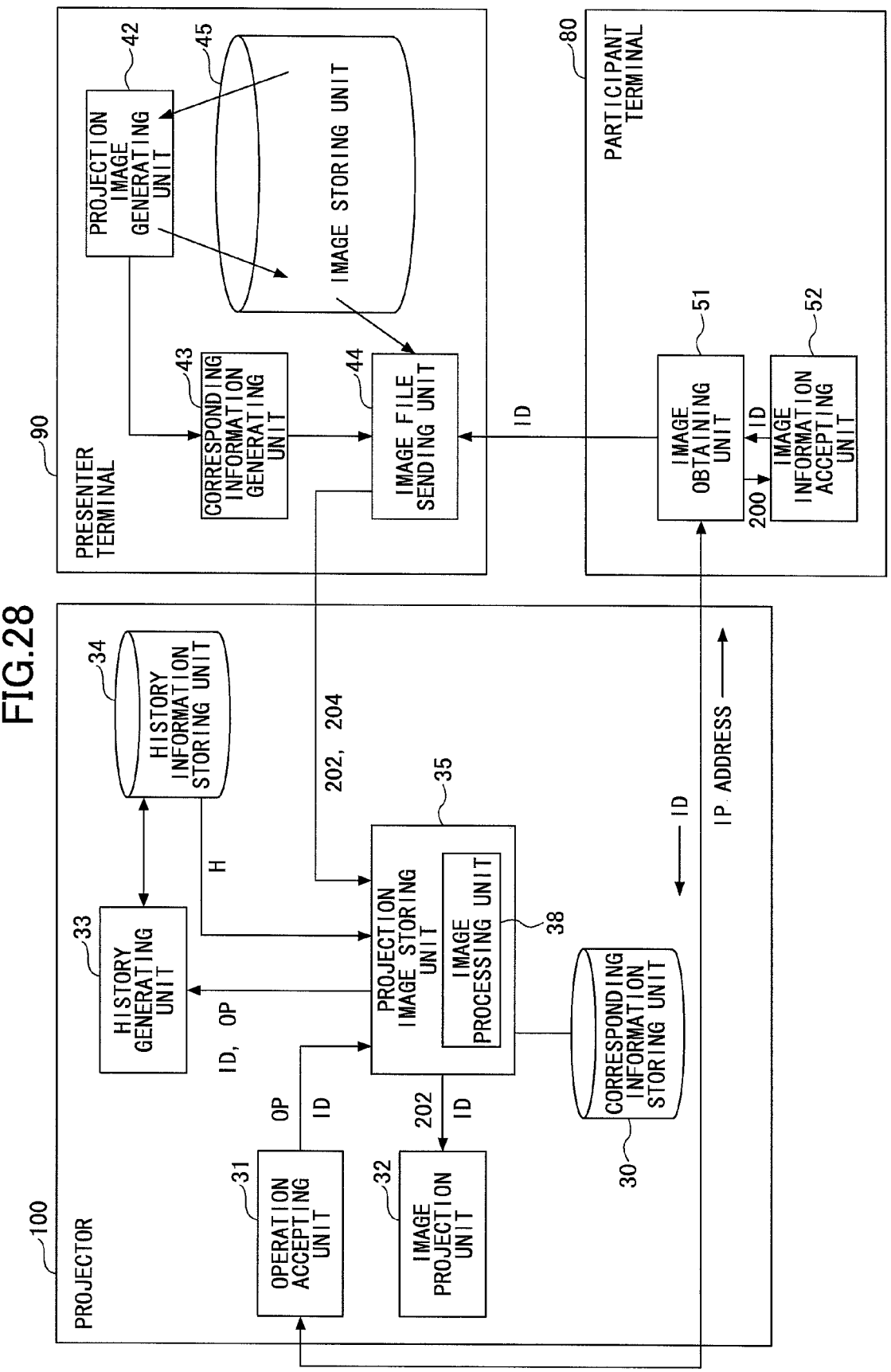
FIG. 28 is a block diagram showing an example of a functional structure of the image projection system of an embodiment.

FIG. 28 is a block diagram showing an example of a functional structure of the image projection system of the embodiment. In FIG. 28, the same components are given the same reference numerals as those shown in FIG. 6, and explanations are not repeated. In this embodiment, the projector 100 does not include the original image obtaining unit 36 and the original image sending unit 37.

The projector 100 reads the IP address corresponding with the image ID of the presenter terminal 90 in the corresponding information 204 in accordance with the request for delivering the original image file 200 from the participant terminal 80 and sends the IP address of the presenter terminal 90 to the participant terminal 80. The image obtaining unit 51 of the participant terminal 80 specifies the presenter terminal 90 by the IP address, and sends a request for delivering the original image file 200 with the image ID of the image file for projection 202 to the presenter terminal 90. The image obtaining unit 51 receives the original image file 200 sent from the presenter terminal 90.

Here, when delivering of the original image file 200 is not permitted by the delivering permit flag in the corresponding information 204, the presenter terminal 90 sends the image file for projection 202 to the participant terminal 80 even when the participant terminal 80 requests the original image file 200. Alternatively, the presenter terminal 90 may not send the image file for projection 202 to the participant terminal 80 as well. Thus, even for a case when the participant terminal 80 requests to obtain the original image file 200 from the presenter terminal 90, the corresponding information 204 is effective.

Further, in the first to fifth embodiments, the projector 100 controls whether to send the original image file 200, the image file for projection 202 or not to send any image files based on the history information in response to the request for delivering the image file from the participant terminal 80. However, according to the present embodiment, where the participant terminal 80 directly obtains the image file from the presenter terminal 90, the projector 100 cannot control this operation.

Therefore, the projector 100 may send rights information indicating it is possible to obtain the original image file 200 from the presenter terminal 90, it is possible to obtain only the image file for projection 202 from the presenter terminal 90, or it is impossible to obtain the original image file 200 and the image file for projection 202, for example, based on the history information with the IP address to the participant terminal 80. The participant terminal 80 may send the rights information with the image ID to the presenter terminal 90. With this operation, the presenter terminal 90 can control whether to send the original image file 200, the image file for projection 202 or not to send the image file to the participant terminal 80, based on the rights information sent from the projector 100 via the participant terminal 80.

Figure 29:
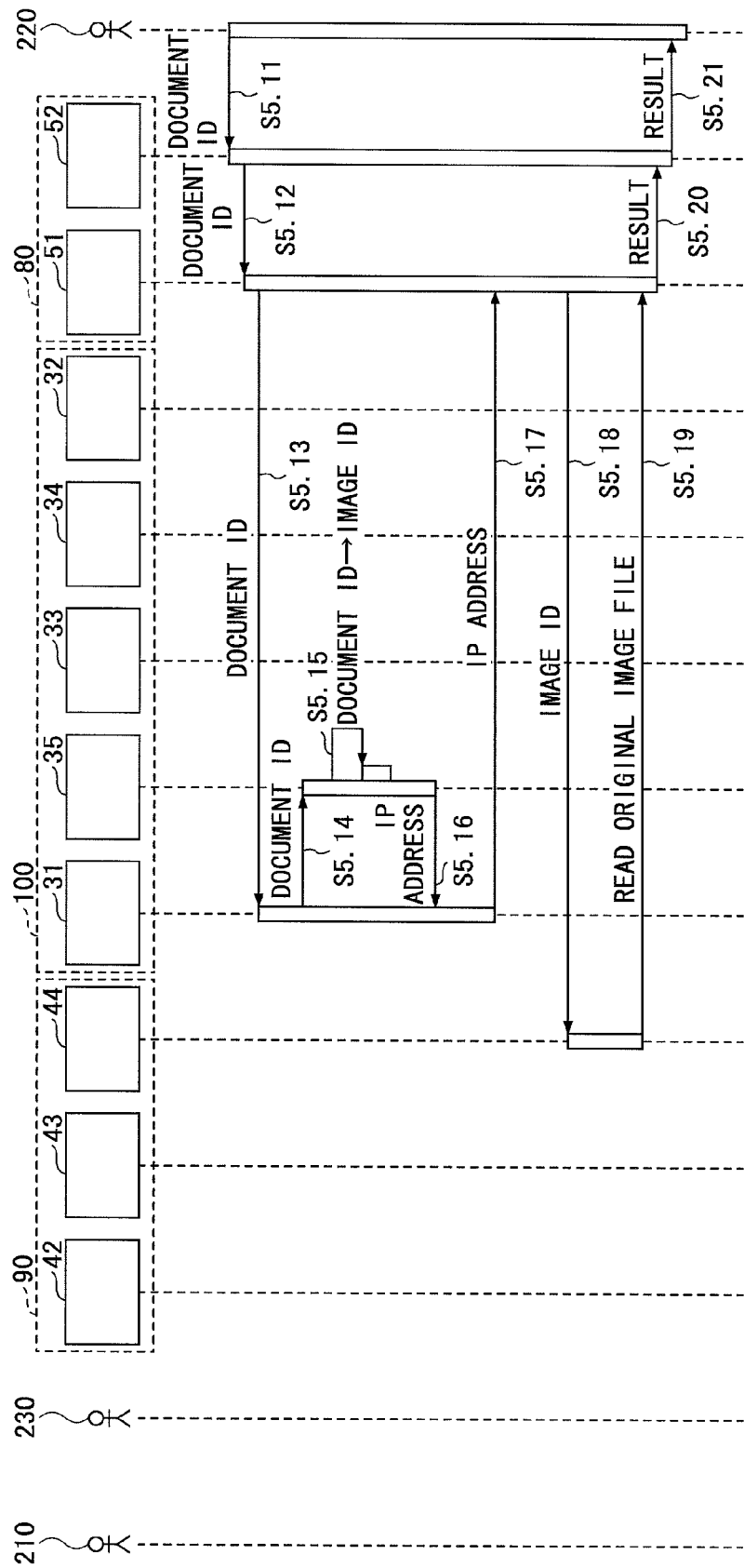
FIG. 29 is a sequence diagram showing an example of an operation of the projector, the participant terminal and the presenter terminal when the participant terminal obtains original image file.

FIG. 29 is a sequence diagram showing an example of an operation of the projector 100, the participant terminal 80 and the presenter terminal 90 when the participant terminal 80 obtains the original image file 200. Further, operation of the projector 100 until projecting the image file and after projecting the image file is the same as that explained in the first embodiment, and is not repeated.

(Operation of Obtaining Original Image File by Participant Terminal)

When the participant wants to obtain the original image file 200 of the image projected by the projector 100, the participant can obtain the original image file 200 using the participant terminal 80.

s5.11: The participant 220 operates the participant terminal 80 for obtaining the original image file 200. The program of the participant terminal 80, similar to that of the presenter terminal 90, is capable of connecting to the projector 100 by the IP address of the projector 100. Further, the participant may input the IP address of the projector 100, which is projected by the projector 100 to connect the participant terminal 80 to the projector 100.

s5.12: The image information accepting unit 52 sends the document ID and requests obtaining the original image file 200 to the image obtaining unit 51.

s5.13: The image obtaining unit 51 sends the request for delivering the IP address of the presenter terminal 90 which stores the original image file 200 specified by the document ID with the document ID to the operation accepting unit 31 of the projector 100.

s5.14: The operation accepting unit 31 sends the document ID and requests the IP address of the presenter terminal 90 to the projection image storing unit 35.

s5.15: The projection image storing unit 35 converts the document ID to the image ID, and reads the IP address of the presenter terminal 90 corresponding to the image ID in the corresponding information 204. The projection image storing unit 35 refers to the corresponding information 204 and determines whether the original image file 200 specified by the image ID is permitted to be delivered.

s5.16: The operation accepting unit 31 obtains the IP address of the presenter terminal 90 from the projection image storing unit 35.

s5.17: The operation accepting unit 31 sends the IP address of the presenter terminal 90 to the image obtaining unit 51.

s5.18: The image obtaining unit 51 selects the IP address of the presenter terminal 90, sends the image ID to the image file sending unit 44 of the presenter terminal 90 and requests obtaining the original image file 200.

s5.19: The image file sending unit 44 reads the original image file 200 from the image storing unit 45 based on the image ID and sends the original image file 200 to the image obtaining unit 51.

s5.20: The image obtaining unit 51 reports the received result of the original image file 200 to the image information accepting unit 52.

s5.21: The image information accepting unit 52 reports the received result of the original image file 200 to the participant 220.

According to the embodiment, as it is unnecessary for the projector 100 to obtain the original image file 200 from the presenter terminal 90, a load on the projector 100 can be reduced.

According to the embodiment, a network system capable of delivering appropriate image data to a participant is provided.

The individual constituents of the network system may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiments allow various modifications.

Although a preferred embodiment of the network system has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

What is claimed is:

1. A network system comprising:
an image projection apparatus that projects image data;
a first terminal; and
a second terminal, connected with each other via a network,
wherein the first terminal includes
an original image data storing unit that stores original image data,
an image data generating unit that generates image data for projection, for which an amount of information is reduced from the original image data, from the original image data,
a corresponding information generating unit that generates corresponding information in which image identification data of the image data for projection capable of identifying the original image data and terminal identification data for identifying the first terminal correspond with each other,
a first sending unit that sends the image data for projection with the respective corresponding information to the image projection apparatus,
a reading unit that reads, upon receiving a request for delivering the original image data stored in the original image data storing unit including the image identification data from the second terminal, the original image data from the original image data storing unit based on the image identification data included in the request, and
a second sending unit that sends the original image data read by the reading unit to the second terminal,
wherein the second terminal includes
a first obtaining unit that sends a request for delivering the corresponding information of image data being projected by the image projection apparatus to the image projection apparatus, and obtains the corresponding information sent from the image projection apparatus in response to the request, and
a second obtaining unit that sends the image identification data included in the corresponding information and a request for delivering image data to the first terminal specified by the terminal identification data included in the corresponding information obtained by the first obtaining unit and obtains the original image data based on the image identification data from the first terminal, and
wherein the image projection apparatus includes
a storing unit that stores the image data for projection in correspondence with the corresponding information sent from the first sending unit,
an image projection unit that projects the image data for projection, and
a corresponding information sending unit that sends, upon receiving the request for delivering the corresponding information of the image data being projected from the second terminal, the corresponding information stored in the storing unit, to the second terminal.

2. The network system according to claim 1, wherein the reading unit of the first terminal reads the original image data from the original image data storing unit when the original image data is permitted to be delivered.

3. The network system according to claim 1, wherein the terminal identification data is an IP address of the first terminal.

4. The network system according to claim 1, wherein the image projection apparatus is a projector.

5. An image projection apparatus, connected to a first terminal and a second terminal via a network,
wherein the first terminal includes
an original image data storing unit that stores original image data,
an image data generating unit that generates image data for projection, for which an amount of information is reduced from the original image data, from the original image data,
a corresponding information generating unit that generates corresponding information in which image identification data of the image data for projection capable of identifying the original image data and terminal identification data for identifying the first terminal correspond with each other,
a first sending unit that sends the image data for projection with the respective corresponding information to the image projection apparatus,
a reading unit that reads, upon receiving a request for delivering the original image data stored in the original image data storing unit including the image identification data from the second terminal, the original image data from the original image data storing unit based on the image identification data included in the request, and
a second sending unit that sends the original image data read by the reading unit to the second terminal, and
the second terminal includes
a first obtaining unit that sends a request for delivering the corresponding information of image data being projected by the image projection apparatus to the image projection apparatus, and obtains the corresponding information sent from the image projection apparatus in response to the request, and
a second obtaining unit that sends the image identification data included in the corresponding information and a request for delivering image data to the first terminal specified by the terminal identification data included in the corresponding information obtained by the first obtaining unit and obtains the original image data based on the image identification data from the first terminal,
the image projection apparatus comprising:
a storing unit that stores the image data for projection in correspondence with the corresponding information sent from the first sending unit;
an image projection unit that projects the image data for projection; and
a corresponding information sending unit that sends, upon receiving the request for delivering the corresponding information of the image data being projected from the second terminal, the corresponding information stored in the storing unit, to the second terminal.

6. The image projection apparatus according to claim 5, wherein the reading unit of the first terminal reads the original image data from the original image data storing unit when the original image data is permitted to be delivered.

7. The image projection apparatus according to claim 5, wherein the terminal identification data is an IP address of the first terminal.

8. The image projection apparatus according to claim 5, wherein the image projection apparatus is a projector.

* * * * *